United States Patent
Yoshino et al.

(10) Patent No.: US 6,900,571 B2
(45) Date of Patent: May 31, 2005

(54) ROTOR FOR SYNCHRONOUS INDUCTION MOTOR, INCLUDING SLOTS AND SLITS, AND COMPRESSOR

(75) Inventors: Hayato Yoshino, Tokyo (JP); Hitoshi Kawaguchi, Tokyo (JP); Yoshio Takita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/330,439

(22) Filed: Dec. 30, 2002

(65) Prior Publication Data

US 2003/0184185 A1 Oct. 2, 2003

(30) Foreign Application Priority Data

Mar. 27, 2002 (JP) .................................... 2002-088115

(51) Int. Cl.$^7$ ........................ H02K 1/32; H02K 17/16; H02K 19/00
(52) U.S. Cl. .................... 310/211; 310/264; 310/261; 310/162
(58) Field of Search ................. 310/261, 264, 310/269, 271, 162, 211, 166–170

(56) References Cited

U.S. PATENT DOCUMENTS

| | | | | |
|---|---|---|---|---|
| 1,375,007 A | * | 4/1921 | Austin | 310/211 |
| 2,913,607 A | * | 11/1959 | Douglas et al. | 310/261 |
| 3,492,520 A | * | 1/1970 | Yates | 310/261 |
| 3,652,885 A | * | 3/1972 | Honsinger | 310/163 |
| 3,688,137 A | * | 8/1972 | Filhol | 310/43 |
| 3,862,446 A | * | 1/1975 | Hilgeman et al. | 310/163 |
| 3,891,879 A | * | 6/1975 | Yamada et al. | 310/163 |
| 4,074,160 A | * | 2/1978 | Broadway | 310/184 |
| 4,146,809 A | * | 3/1979 | Rielly | 310/261 |
| 4,324,996 A | * | 4/1982 | Adelski et al. | 310/156.83 |
| 4,476,408 A | * | 10/1984 | Honsinger | 310/156.84 |
| 4,510,403 A | * | 4/1985 | Vanderlaan et al. | 310/36 |
| 4,674,178 A | * | 6/1987 | Patel | 29/598 |
| 4,729,160 A | * | 3/1988 | Brown | 29/598 |
| 4,769,568 A | * | 9/1988 | Kawamura | 310/168 |
| 4,855,630 A | * | 8/1989 | Cole | 310/156.28 |
| 4,912,354 A | * | 3/1990 | Frank | 310/271 |
| 4,924,130 A | * | 5/1990 | Fratta | 310/261 |
| 4,930,201 A | * | 6/1990 | Brown | 29/598 |
| 5,371,426 A | * | 12/1994 | Nagate et al. | 310/156.49 |
| 5,504,382 A | * | 4/1996 | Douglass et al. | 310/156.25 |
| 5,801,478 A | * | 9/1998 | Nashiki | 310/261 |

(Continued)

FOREIGN PATENT DOCUMENTS

| | | | | |
|---|---|---|---|---|
| JP | 57-180359 | 11/1982 | .......... | H02K/21/08 |
| JP | 58-46856 | 3/1983 | .......... | H02K/21/08 |
| JP | 8-289493 | 11/1996 | ............ | H02K/1/28 |

*Primary Examiner*—Darren Schuberg
*Assistant Examiner*—Pedro J. Cuevas
(74) *Attorney, Agent, or Firm*—Oblon, Spivak, McClelland, Maier & Neustadt, P.C.

(57) ABSTRACT

The present invention aims to strengthen the durability against the centrifugal force acted on a rotor of a synchronous induction motor to increase reliability of the motor. The rotor for the synchronous induction motor of the invention includes: at least one pair of slits forming salient poles in a direction of a d axis in which the magnetic flux can flow easily and in a direction of a q axis in which the magnetic flux can hardly flow; and plural slots located at an outer circumference side of the slits and connected to at least one end of the slits in the direction of the d axis to generate induction torque. Conductive material is filled in at least the slots among the slits and the slots. The rotor is provided with a rotor cover made of a non-magnetic body as a reinforcing member to strengthen the rotor against the centrifugal force acted at the outer side of the direction of a diameter.

7 Claims, 24 Drawing Sheets

U.S. PATENT DOCUMENTS

| | | | | |
|---|---|---|---|---|
| 5,831,367 A | * | 11/1998 | Fei et al. | 310/217 |
| 5,893,205 A | * | 4/1999 | McClelland | 29/598 |
| 5,903,080 A | * | 5/1999 | Nashiki et al. | 310/168 |
| 5,945,760 A | * | 8/1999 | Honda et al. | 310/156.53 |
| 6,060,805 A | * | 5/2000 | Ohtake et al. | 310/87 |
| 6,066,904 A | * | 5/2000 | Fei et al. | 310/168 |
| 6,084,496 A | * | 7/2000 | Asano et al. | 335/284 |
| 6,121,706 A | * | 9/2000 | Nashiki et al. | 310/168 |
| 6,140,719 A | * | 10/2000 | Kalsi | 310/52 |
| 6,144,130 A | * | 11/2000 | Kawamura | 310/156.28 |
| 6,239,526 B1 | * | 5/2001 | Oh et al. | 310/168 |
| 6,710,498 B1 | * | 3/2004 | Lee et al. | 310/211 |
| 6,741,003 B2 | * | 5/2004 | Naito et al. | 310/156.53 |
| 6,774,519 B2 | * | 8/2004 | Pullen et al. | 310/156.28 |

* cited by examiner

1: ROTOR IRON CORE
2, 2a, 2b, 2c, 20a, 20b, 20c: SLITS
3, 3a, 3b, 3c, 30a, 30b, 30c: SLOTS
4: SHAFT
5: OPENING
6: ROTOR COVER

8:HOLE

11:ROTOR COVER 11a, 11b: ROTOR COVER 12a, 12b : ROTOR COVER

13: ROTOR COVER 14a,14b:PART TO BE PRESSED 16  15:END RING DIE
16:OUTER CIRCUMFERENCE DIE

← q-AXIS

ROTOR FOR SYNCHRONOUS INDUCTION MOTOR, INCLUDING SLOTS AND SLITS, AND COMPRESSOR

BACKGROUND OF THE INVENTION

1. Field of the Invention

The present invention relates to a rotor of a synchronous induction motor which is started using induction torque and synchronously operates using reluctance torque, a manufacturing method of the rotor, a die for the rotor, and a compressor employing the synchronous induction motor.

2. Description of the Related Art

FIG. 25 is a cross sectional view showing a rotor of a conventional synchronous induction motor, for example, a permanent magnetic synchronous motor disclosed in the Japanese Unexamined Patent Publication No. 57-180359. In the figure, a reference numeral 21 shows a rotor iron core, 22 shows a permanent magnet, and 24 shows a slot in which aluminum is filled by die-casting method, which form a cage secondary conductor with an end ring (not illustrated). Further, 23 shows a rotor cover made of nonmetallic material.

In the synchronous induction motor, aluminum is filled in the slot 24 to form a cage secondary conductor. Since the synchronous induction motor is started by a stator coil placed around the slot 24, there is no need to provide a special starting device. Further, after started, magnetic field which contributes to generation of torque can be formed by the permanent magnet 22. Since the synchronous induction motor does not need to be supplied electric current to excite, which enables to form the electric motor with high efficiency.

Four permanent magnets 22 are placed on an outer circumference of the rotor iron core, and the outer circumference of the permanent magnet 22 is covered with the nonmetallic rotor cover 23 to prevent the permanent magnet from being dispersed due to centrifugal force caused by the rotation of the rotor. Further, since the rotor cover 23 is made of nonmetallic material, eddy current is not generated on the surface of the rotor cover 23, which enables to obtain the permanent magnetic synchronous motor without eddy current loss.

As the conventional synchronous induction motor, the permanent magnet synchronous motor is formed as described above, and there are some problems as follows.

The permanent magnet 22 is placed on the outer circumference of the iron core 21 of the rotor, which creates problems such that when the rotor is driven at high speed, the motor vibrates or generates noise due to uneven processing of the circumference of the permanent magnet 21, or the motor does not have enough strength against the centrifugal force, and the motor does not last long. In order to reduce uneven processing, the processing precision must be increased, which results in an increment of the processing cost. Further, since the permanent magnets 22 are placed on the whole surface of the outer circumference of the iron core 21 of the rotor, all the permanent magnets 22 receive the centrifugal force. Accordingly, the rotor cover 23 must be covered the whole surface of the outer circumference of the rotor iron core, which requires an expensive rotor cover 23. If the rotor cover 23 is made thin to reduce the cost of the rotor cover 23, which creates another problem that the strength of the rotor cover 23 is decreased against the centrifugal force. Further, another step is required to magnetize the permanent magnet 22, which further increases the processing cost. Yet further, upon scraping the motor, recycability is low, since the permanent magnet is used.

SUMMARY OF THE INVENTION

The present invention aims to provide the synchronous induction motor without the permanent magnet, which has a good recycability, a high efficiency, and a high reliability at a low cost.

Further, the present invention aims to provide a manufacturing method for manufacturing the rotor for the synchronous induction motor with a high reliability and a die of the rotor for the synchronous induction motor.

According to the present invention, a rotor for a synchronous induction motor includes:

at least one pair of slits provided at a rotor and forming salient poles in a direction of a d axis in which the magnetic flux can flow easily and in a direction of a q axis in which the magnetic flux can hardly flow;

plural slots located at an outer circumference side of the at least one pair of slits and connected to at least one end of each slit of the at least one pair of slits in the direction of the d axis to generate induction torque;

a conductive material filled in at least the plural slots among the at least one pair of slits and the plural slots; and a reinforcing member, which is a non-magnetic body, located at least an outer circumference side in the direction of the q axis for reinforcing the rotor from the outer circumference side.

In the rotor for the synchronous induction motor of the invention, the reinforcing member is a non-magnetic body and a non-conductive material.

In the rotor for the synchronous induction motor of the invention, the reinforcing member has plural holes.

In the rotor for the synchronous induction motor of the invention, the plural holes provided at the reinforcing member are located at approximately same position of the slots located at the outer circumference side.

The rotor for the synchronous induction motor of the invention further includes an output axis located at a center of rotation, and the reinforcing member is fixed to the output axis.

The rotor for the synchronous induction motor of the invention further includes a flat plane at the outer circumference side in the direction of the q axis of the rotor, and the reinforcing member is placed at the flat plane.

In the rotor for the synchronous induction motor of the invention, the reinforcing member is divided into plural pieces in a direction of lamination or a circumference direction of an iron core of the rotor.

According to the present invention, a rotor for a synchronous induction motor includes:

at least one pair of slits provided at a rotor and forming salient poles in a direction of a d axis in which the magnetic flux can flow easily and in a direction of a q axis in which the magnetic flux can hardly flow;

plural slots located at an outer circumference side of the at least one pair of slits and connected to at least one end of each slit of the at least one pair of slits in the direction of the d axis to generate induction torque;

a conductive material filled in at least a part of the at least one pair of slits and the plural slots;

an output axis located at a center of rotation of the rotor; and a reinforcing member, which is a non-magnetic body, fixed to the output axis and inserted in the slits of the rotor or at least one of the plural slots located in the direction of the q axis of the rotor to reinforce the rotor against a stress acted in the direction of the q axis.

In the rotor for the synchronous induction motor of the invention, a part of the at least one pair of slits or a part of the plural slots which inserts the reinforcing member is fixed to the at least one pair of slits and the plural slots by the conductive material filled in the at least the part of the at least one pair of the slits and the plural slots.

According to the present invention, a rotor for a synchronous induction motor includes:

at least one pair of slits provided at a rotor and forming salient poles in a direction of a d axis in which the magnetic flux can flow easily and in a direction of a q axis in which the magnetic flux can hardly flow;

plural slots located at an outer circumference side of the at least one pair of slits and connected to at least one end of each slit of the at least one pair of slits in the direction of the d axis to generate induction torque; and a conductive material filled in at least the plural slots among the at least one pair of slits and the plural slots under a condition in which at least a part adjacent to the q axis of one end of the rotor is pressed towards other end of the rotor.

According to another aspect of the invention, a compressor includes the rotor of the synchronous induction motor of the invention.

According to another aspect of the invention, a manufacturing method of a rotor for a synchronous induction motor having:

at least one pair of slits provided at a rotor and forming salient poles in a direction of a d axis in which the magnetic flux can flow easily and in a direction of a q axis in which the magnetic flux can hardly flow; and plural slots located at an outer circumference side of the at least one pair of slits and connected to at least one end of each slit of the at least one pair of slits in the direction of the d axis to generate induction torque, the manufacturing method includes steps of:

stamping the at least one pair of slits and the plural slots on an iron core of the rotor;

laminating the iron core of the rotor stamped; and filling conductive material in the at least the plural slots among the at least one pair of slits and the plural slots under a condition in which at least a part adjacent to the q axis of one end of the rotor is pressed towards other end of the rotor.

According to another aspect of the invention, a die of a rotor for a synchronous induction motor includes:

a first die for pressing an outer circumference side of a iron core of the rotor; and a pair of second dies for pressing both ends of the iron core of the rotor so that conductive material is filled from one end to other end at least through a slot, and the pair of second dies presses an outline of an end of the iron core of the rotor, and presses by extending at a center of the end of the iron core of the rotor in a direction of a q axis in which magnetic flux can hardly flow.

BRIEF EXPLANATION OF THE DRAWINGS

A complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Embodiment 1.

Figure 1:
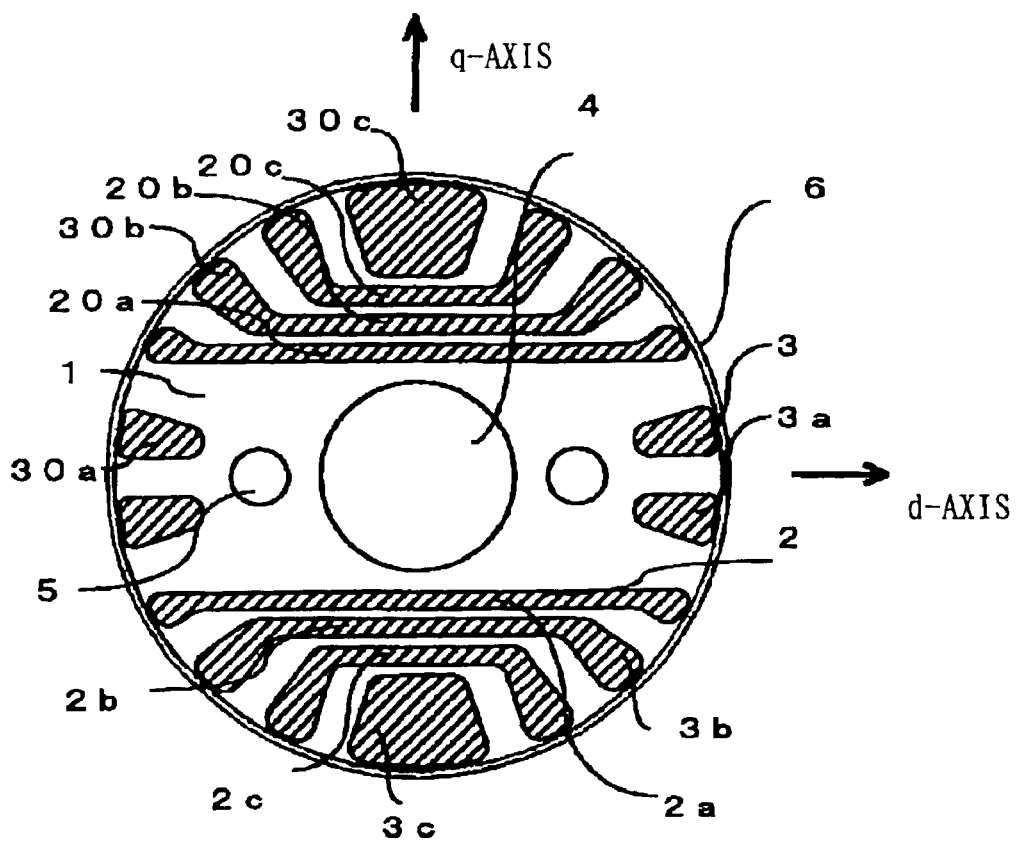
FIG. 1 is a top view showing an end side of a rotor for a synchronous induction motor in an axial direction except for an end ring according to the first embodiment of the present invention.
Figure 2:
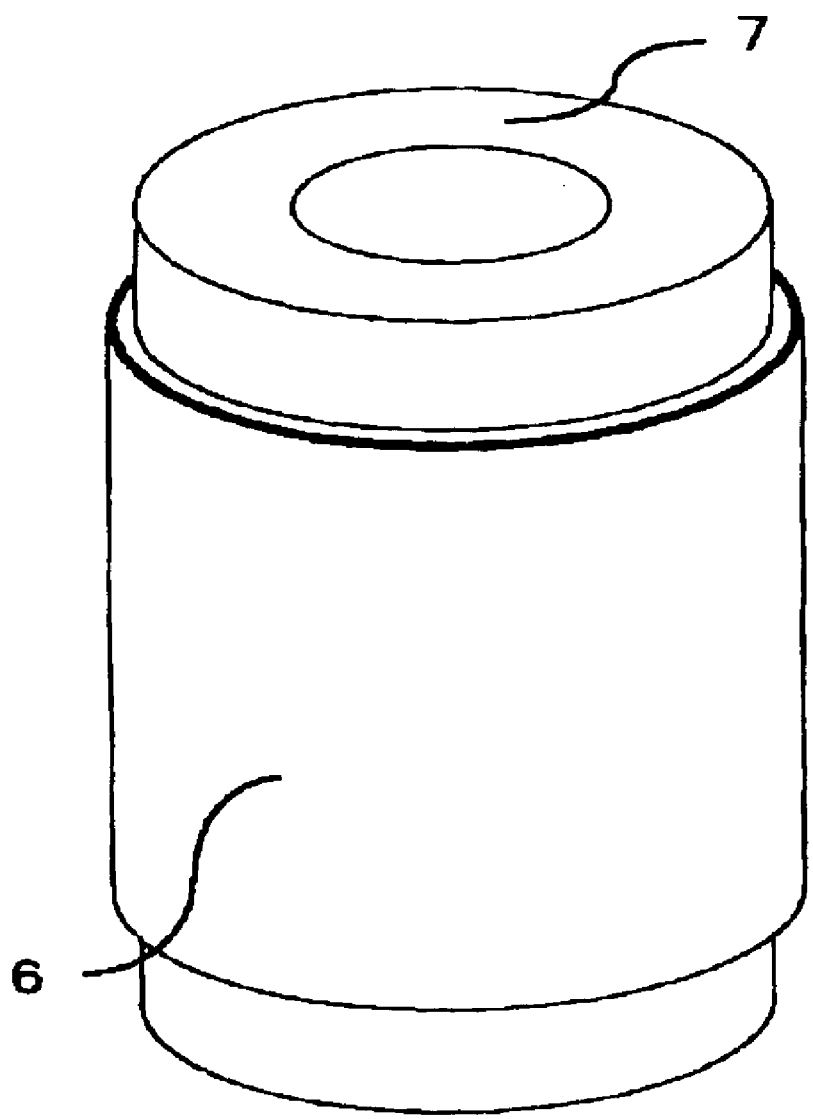
FIG. 2 is a slanted view showing the rotor for the synchronous induction motor according to the first embodiment.

Hereinafter, the first embodiment of the present invention will be explained referring to the figures. FIG. 1 is a top view showing an end side of a rotor for a synchronous induction motor in an axial direction except for an end ring according to the first embodiment of the present invention. In the figure, slits 2 and slots 3 are shaded for the purpose of clarity. Further, FIG. 2 is a slanted view of the rotor for the synchronous induction motor according to the first embodiment.

In the figure, a reference numeral 1 shows an iron core of a rotor (also called a rotor iron core) which is formed by electromagnetic steel plate which is a magnetic body. The rotor is formed by laminating plural electromagnetic steel plates whose thickness is equal to or less than 1 mm. Reference numerals 2, 2a, 2b, 2c, 20a, 20b, and 20c show slits, and inside of the slits, aluminum which is non-magnetic and conductive material is filled. Reference numerals 3, 3a, 3b, 3c, 30a, 30b, and 20c show slots, inside of the slots, aluminum is filled as well as the slots 2. 4 shows an output axis, for example, a shaft fixed to the rotor by such as press-fit or baking, and 5 is an opening which is a hole made by penetrating the rotor iron core 1 in the direction of lamination. The opening 5 becomes a passage for refrigerant, etc. in case of employing the synchronous induction motor of the invention in a compressor which forms a refrigeration cycle. Further, 6 shows a reinforcing member such as a rotor cover, and 7 shows an end ring.

As shown in FIG. 1, plural slots 3a, 3b, 3c, 30a, 30b, 30c, and so on are placed in radial and approximately evenly against a center of the rotor iron core 1, which generates induction torque. Here, the slits 2a and 20a are placed approximately in parallel so that a d axis which is a direction in which the magnetic flux can flow easily and a q axis which is a direction in which the magnetic flux can hardly flow should be obtained. The slits 2a and 20a are connected in a straight line between the slots 3 which are placed in radial so that the slits 2a and 20a becomes placed approximately in parallel with the d axis. Further, the slits 2 are placed so that the d axis and the q axis cross in right angle by passing an approximate center of the rotor, and two salient poles are formed. Namely, the slots 3 are serially connected to both ends of the slits 2 in a longitudinal direction (the direction of the d axis).

Further, the slits 2a, 2b, and 2c and the slits 20a, 20b, and 20c are placed at approximate the same distance from the d axis which passes through the approximate center of the rotor iron core 1, namely, they are placed in straight lines and in approximate parallel with each other, which respectively make pairs. The slits 2 consist of, for example, three pairs of the slits 2a and 20a, the slits 2b and 20b, and the slits 2c and 20c, putting the d axis inbetween.

By having a structure as explained above, the rotor has the d axis which is the direction in which the magnetic flux can flow easily and passes a wider part of the rotor iron core 1 and the q axis which is a direction in which the magnetic flux can hardly flow and crosses the slits 2 which are non-magnetic material and placed in parallel with each other. A stator is placed around the rotor with a predetermined gap, and the magnetic flux is generated by the stator and has two magnetic projections according to the position of the rotor.

As shown in FIG. 2, end rings 7 made of aluminum which is conductive material are placed in a direction of lamination of the rotor iron core 1, namely, placed at both ends in the axial direction by aluminum die-casting method. A secondary conductor is formed as a cage shape by aluminum filled in the plural slits 2 and the plural slots, and the end rings 7. In FIG. 2, the shaft is not illustrated.

When electric power supply of 50 Hz and 60 Hz are connected to a stator coil to drive the synchronous induction motor, a secondary current flows through the secondary conductor of the cage shape, induction torque is generated and the synchronous induction motor is started. Accordingly, the motor can be started without a specific starting equipment, which enables to obtain the synchronous induction motor with a low cost. Further, since the salient poles enable the synchronous operation, the motor with a high efficiency can be obtained, in which the secondary copper loss is reduced.

The rotor cover 6 which is a reinforcing member is made of non-magnetic, is placed at an outer circumference side in at least the direction of the q axis, and reinforces the rotor from the outer circumference. Here, the rotor cover 6 is made of the non-magnetic material such as a certain kind of SUS (stainless) and placed at the outer circumference, for example, at the whole outer circumference of the rotor. The rotor cover 6 is formed so as to be, for example, longer in the axial direction of the rotor than the rotor itself, and its difference is bent towards both ends of the rotor and is fixed such as press-fit.

The slots 3 are placed at a part adjacent to the outer circumference which is apart from the center of the rotor iron core 1, and the rotor iron core 1 is connected at the further outer side. At starting time, when the induction torque is generated by running current into the conductive material of the slots 3, it is required to make the gap with the surrounding stator small. Accordingly, the rotor iron core 1 formed outside the slots 3 is connected by a thin connection part having a thickness of, for example, equal to or less than 1 mm at adjacent to the outer circumference.

With this status, if the rotor is rotated at a high speed, the rotor is expanded towards the outside due to the centrifugal force acted on the rotor, and a stress is concentrated to the thin connection part. Consequently, the strength against the centrifugal force is not sufficient to shorten a life of the motor, and the rotor iron core 1 may be destroyed. Accordingly, the rotor cover 6 is provided around the rotor as the reinforcing member, which enhances the strength of the rotor iron core 1 against the centrifugal force, and the rotor of the synchronous induction motor with good endurance and high reliability can be obtained.

If conductive material such as metal is used for the rotor cover 6, eddy current flows on the outer surface of the rotor cover 6 to generate eddy current loss, which may cause the rotor to produce heat. Accordingly, the rotor cover is formed with nonconductive material such as plastic, which prevents the eddy current loss, and the synchronous induction motor with high reliability which suppresses production of heat of the rotor can be obtained.

In case of mounting the synchronous induction motor on a compressor, since the synchronous induction motor does not slip and is highly efficient, a compressor with high efficiency and high reliability can be obtained. Further, since the permanent magnet is not used in this structure of the motor, recyclability becomes high on scrapping the motor.

Embodiment 2.

Figure 3:
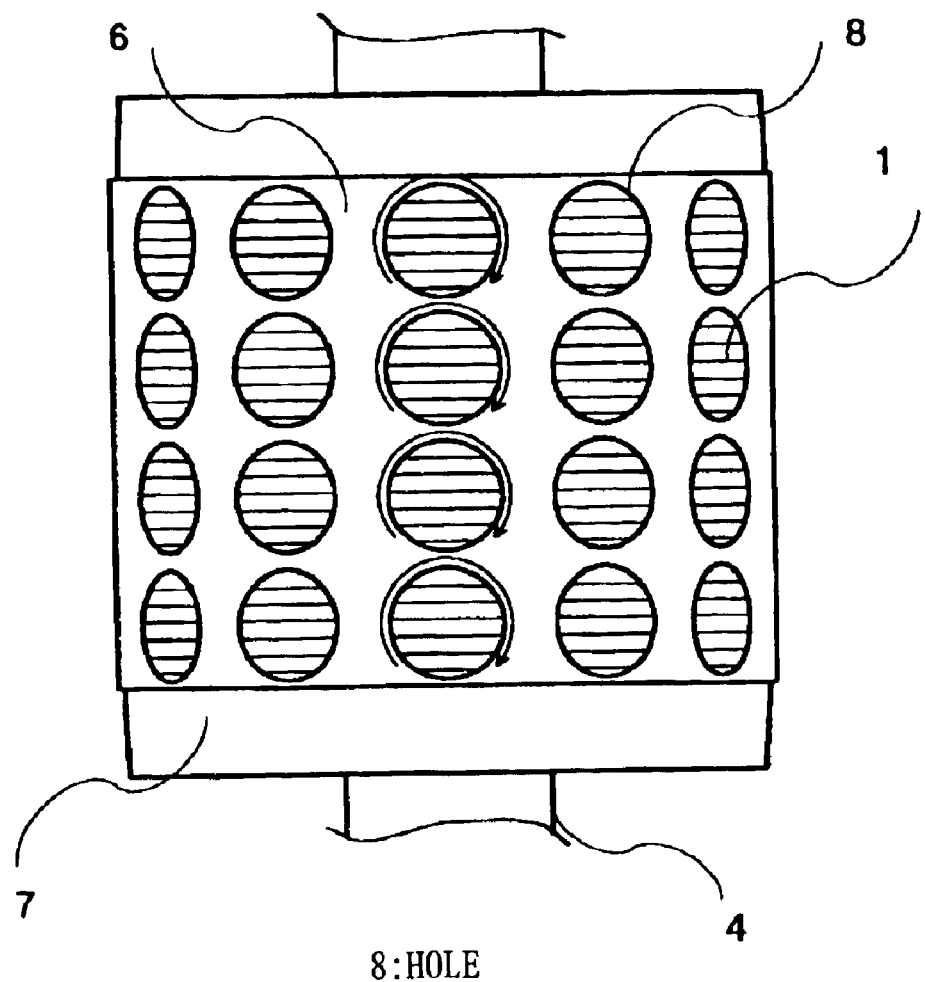
FIG. 3 is a side view showing a rotor for a synchronous induction motor according to the second embodiment of the present invention.

The second embodiment of the present invention will be explained referring to the figures. FIG. 3 is a side view showing a rotor for a synchronous induction motor. In the second embodiment, the rotor cover 6 of reinforcing member is provided with plural holes 8. The same signs are put on elements which are the same or similar to ones explained in the first embodiment, and their explanation is omitted here. Further, a main structure, operation, and effect are the same as ones in the first embodiment as the synchronous induction motor.

If conductive material such as metal is used for the rotor cover 6, eddy current flows on the outer surface of the rotor cover 6 as shown by an arrow in FIG. 3 to generate eddy current loss. In the present embodiment, by providing the plural holes 8, a passage in which the eddy current flows is lengthened, which substantially increases electric resistance and can reduce the eddy current loss. Consequently, the reduction of the efficiency of the synchronous induction motor cause by the eddy current loss can be prevented.

Here, although the hole 8 is made circular in FIG. 3, the shape of the hole is not limited to this example, but can be any shape such as elliptic or square. However, when the shape of the hole is made so as to make longer the passage in which the eddy current flows, the eddy current loss can be reduced more, which is more effective.

Figure 4:
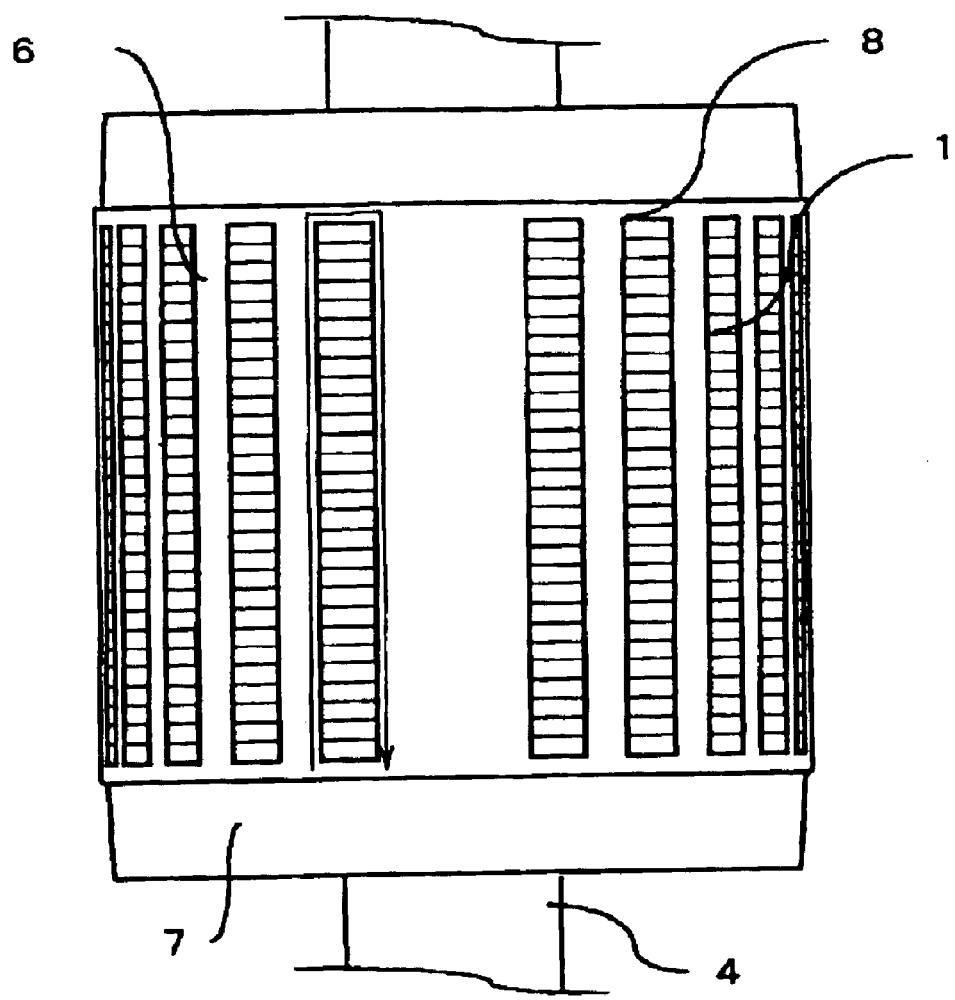
FIG. 4 is a side view showing the rotor for the synchronous induction motor according to the second embodiment.

FIG. 4 is a side view showing another rotor for the synchronous induction motor according to the present embodiment. In FIG. 4, the hole 8 is placed long in the direction of lamination of the rotor, so that the position of the slots 3 and the rotor cover 6 of the reinforcing member are approximately matched on the outer circumference of the rotor.

As discussed above, if the conductive material such as metal is used for the rotor cover 6, the eddy current is generated on the surface of the rotor cover 6 as shown by an arrow in FIG. 4. At starting time of the synchronous induction motor, electric current flows through the secondary conductor of cage shape consisting of aluminum filled in the slits 2 and the slots 3 and the end ring 7 to generate induction torque, which starts the motor. If the secondary current is increased, it becomes possible to start the motor stably even if the load may be generated, which improves the synchronous pull-in capacity further. According to the present embodiment, the rotor for the synchronous induction motor is provided with the holes 8 so that the direction in which the eddy current flows on the surface of the rotor cover 6 and the direction in which the current flows in the secondary conductor are approximately matched. Consequently, the secondary current can be essentially increased and the startup capacity of the motor is improved, so that it becomes possible to start the motor stably even if the load is high on startup. Further, the present embodiment improves the synchronous pull-in capacity. Therefore, the synchronous induction motor with high reliability can be obtained.

In the present embodiment, the holes 8 are provided in the direction matched with the direction of lamination of the rotor iron core, however, the holes can be placed in a slanted direction to increase the secondary current, which improves the startup capacity. Further, in this embodiment, the hole 8 is made square, but the shape of the hole 8 can be any kind of shape such as elliptic.

Embodiment 3.

Figure 5:
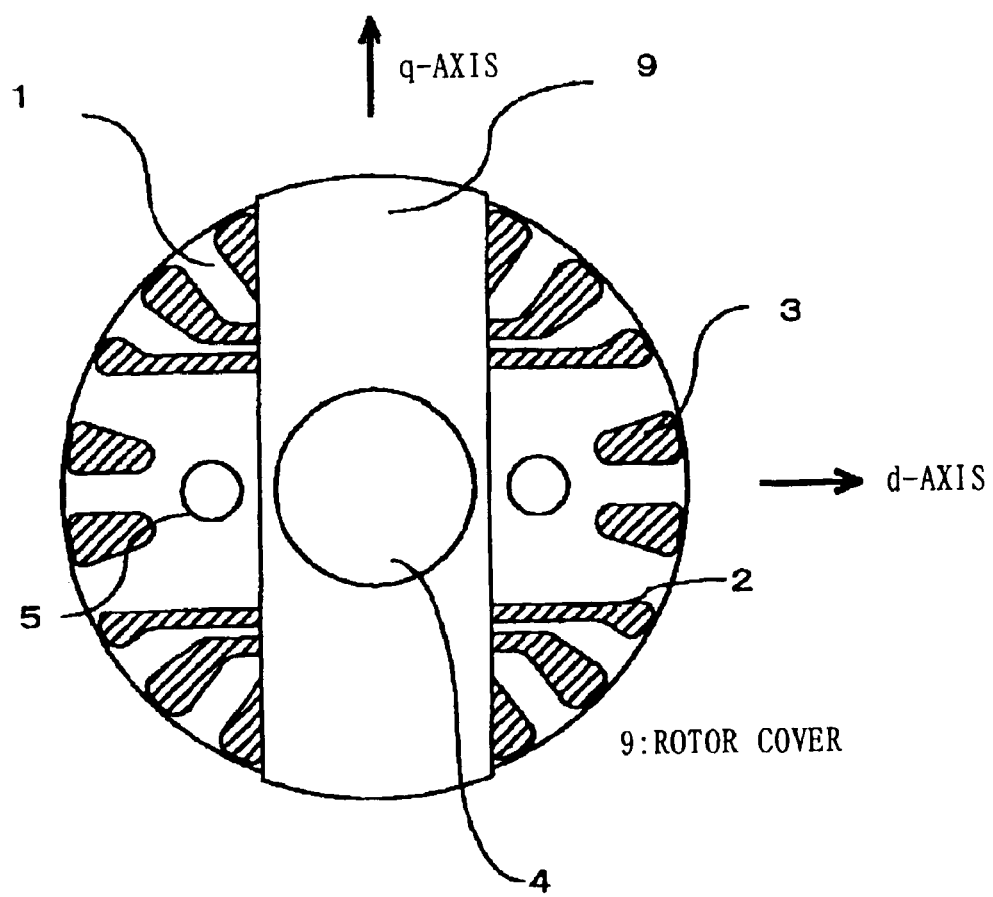
FIG. 5 is a top view showing an end side of a rotor for a synchronous induction motor in an axial direction except for an end ring according to the third embodiment of the present invention.
Figure 6:
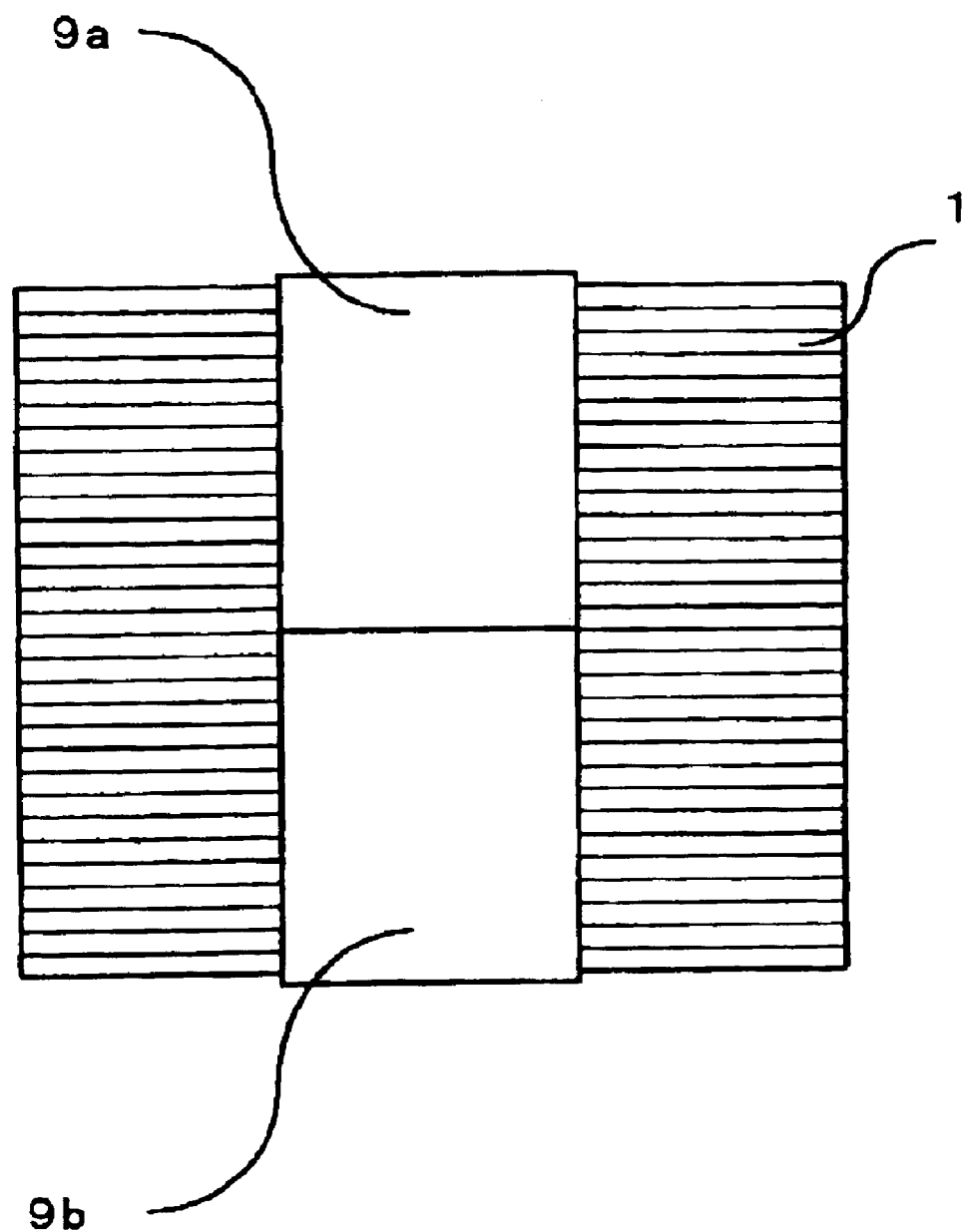
FIG. 6 is a side view showing the rotor for the synchronous induction motor according to the third embodiment.
Figure 7:
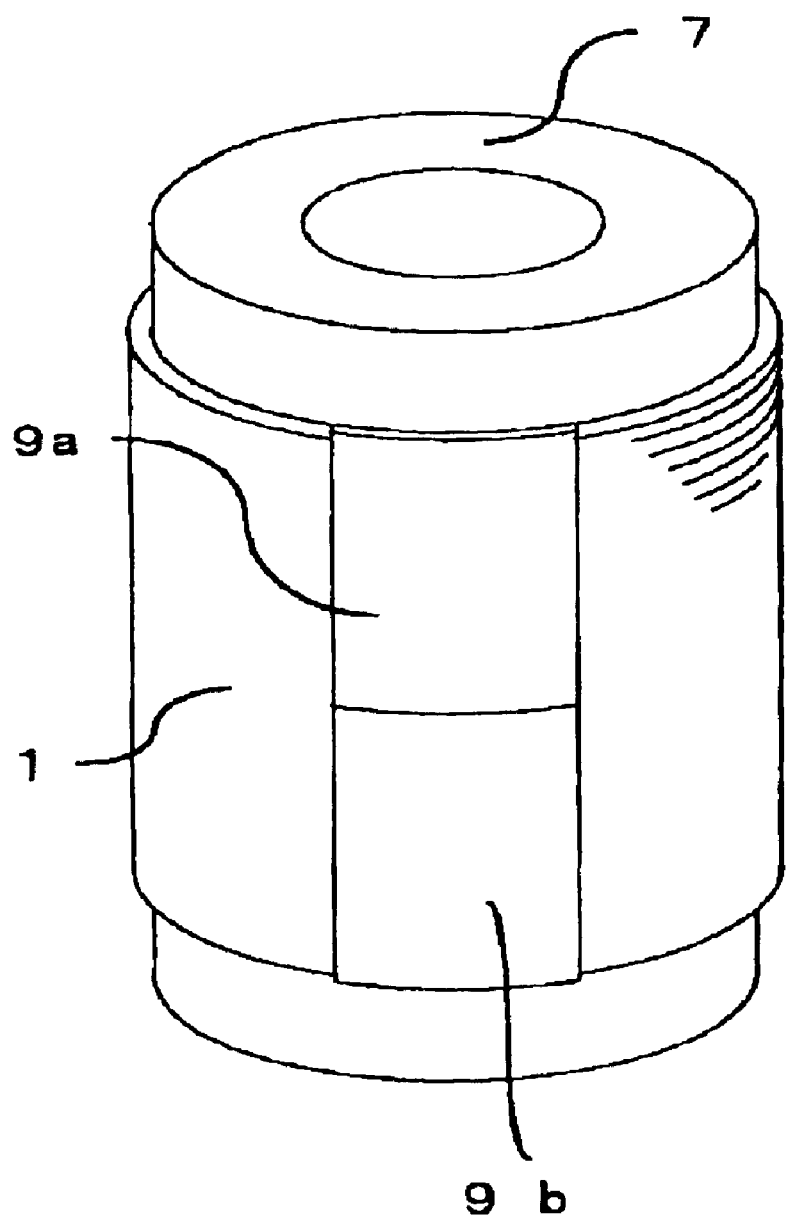
FIG. 7 is a slanted view showing the rotor for the synchronous induction motor according to the third embodiment.

The third embodiment of the present invention will be explained referring to the figures. FIG. 5 is a top view showing an end side of a rotor for a synchronous induction motor according to the third embodiment in the axial direction except for an end ring, FIG. 6 is a side view, and FIG. 7 is a slanted view including the end ring 7. In FIG. 5, the slits 2 and the slots 3 are shaded for the purpose of clarity. Further, in the figure, 9 shows the reinforcing member which is placed at least at the outer circumference side of the rotor in the direction of the q axis, and reinforces the rotor from the outer circumference side against the stress acted in the direction of the q axis. Here, the reinforcing member 9 is, for example, the rotor cover which is formed by non-magnetic material such as a certain kind of SUS having equal to or less than 1 mm. The same signs are put on the same or similar elements as ones explained in the first embodiment, and their explanation is omitted here. Further, the main structure, operation, effect are the same as ones in the first embodiment.

The rotor cover 9 consists of two covers 9a and 9b, and they are separated in the direction of lamination of the rotor iron core 1. The rotor covers 9a and 9b are formed so as to contact with each other at approximate middle in the direction of lamination of the outer circumference of the rotor. Further, the rotor cover 9 has a part which is placed at an end of the rotor and another part which is located at the outer circumference in the direction of the q axis of the rotor, and the part which is placed at the outer circumference in the direction of the q axis of the rotor forms an arc along the outer circumference of the rotor. Further, the part which is located at an end of the rotor has a hole for inserting the shaft 4. In surfaces of both ends of the rotor, the rotor cover 9 is placed so as to stretch from the shaft 4 towards the direction of the q axis. The opening 5 becomes a passage in which such as refrigerant flows in case of employing the synchronous induction motor in the compressor which forms a refrgerant cycle. The rotor cover 9 is formed not to cover the opening 5.

Since the slit 2 has a slim shape, the rotor iron core 1 is pulled in the direction of the q axis when the centrifugal force is acted on the iron core 1 due to the high-speed rotation. Accordingly, the rotor cover 9 is placed at least at the outer circumference in the direction of the q axis at which mechanical strength is weak, which prevents the rotor from being pulled in the direction of the q axis due to the centrifugal force.

In particular, since the rotor cover 9 is fixed to the shaft 4 which is a center of rotation at the end part of the rotor, the rotor cover 9 has a strong structure against the stress in the radial direction, which can steadily hold the rotor against the pulling force in the direction of the q axis.

As discussed in the first and the second embodiments, when the rotor cover 9 is made of conductive material, the eddy current loss is generated at the rotor cover 9 placed at the outer circumference of the rotor. In this case, if an area of the rotor cover 9 is made smaller compared with ones of the first and the second embodiments, the electric resistance essentially increases. Accordingly, the present embodiment can reduce the eddy current loss, and the synchronous induction motor with high efficiency can be obtained. Further, since the area of the rotor cover 9 is made small, the producing cost of the rotor cover 9 can be reduced, and the synchronous induction motor of low cost can be obtained.

Here, a manufacturing method of the rotor for the synchronous induction motor in relation to the present embodiment will be explained. In order to hold the rotor cover 9 which is placed at a part of the outer circumference of the rotor iron core 1, a hole is opened at a part which is placed at the end of the rotor cover 9 for inserting the shaft 4. After a predetermined number of pieces of the rotor iron core 1 are laminated, the iron core 1 is covered with the rotor covers 9a and 9b from the top and the bottom, with letting the shaft insert. Afterwards, the slits 2 and the slots 3 are filled with, for example, aluminum, which generates the secondary conductor together with the end ring 6.

When the rotor is manufactured in the above way, the rotor cover 9 and the secondary conductor of aluminum are adhered well, the rotor cover 9 can be fixed steadily, and the strength of the rotor against the centrifugal force can be enhanced further.

Further, the reinforcing member is made plural, for example, two, it is easy to mount the reinforcing member upon manufacturing the rotor. Consequently, the synchronous induction motor with high productivity can be obtained.

It is not necessary to make the thickness of the rotor cover 9 even, but a part to be placed at the end of the rotor in the direction of lamination can be thicker than a part to be placed at the outer circumference of the rotor. If the part to be placed at the outer circumference is made thicker, a gap with the stator which is placed around the rotor, which degrades the efficiency of the synchronous induction motor. It is possible to prevent this degradation by making a part of the rotor cover 9 which faces the outer circumference of the iron core thin.

Figure 8:
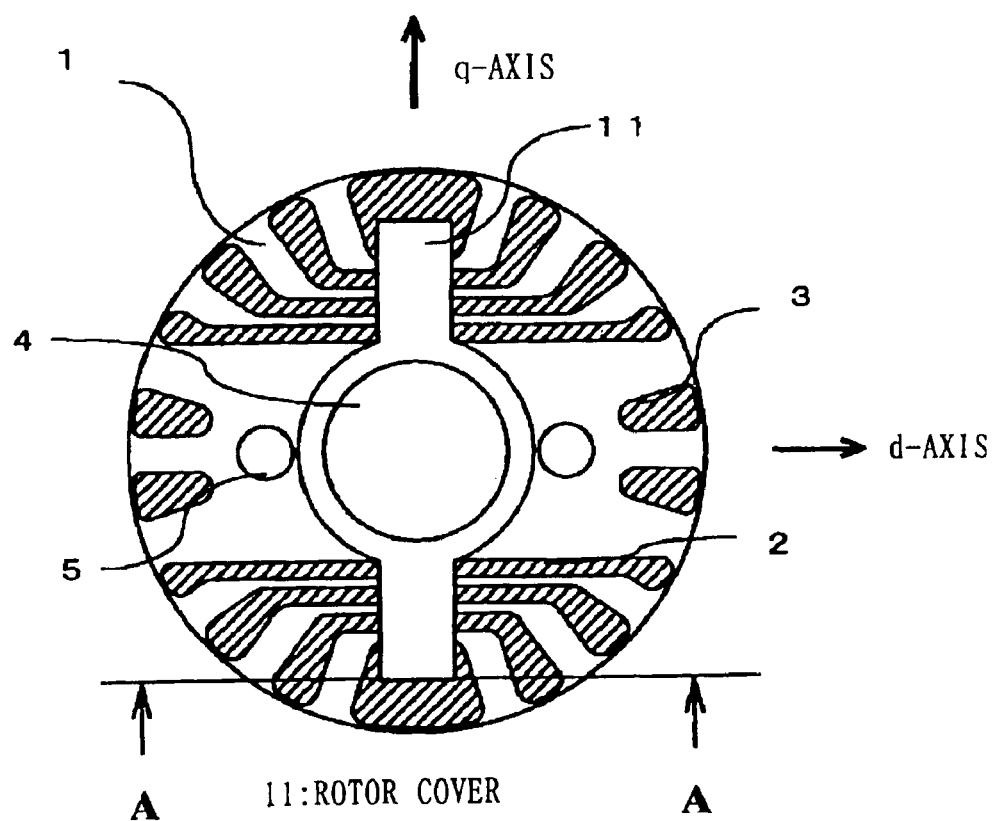
FIG. 8 is a top view showing an end side of the rotor for the synchronous induction motor in an axial direction except for an end ring according to the third embodiment.
Figure 9:
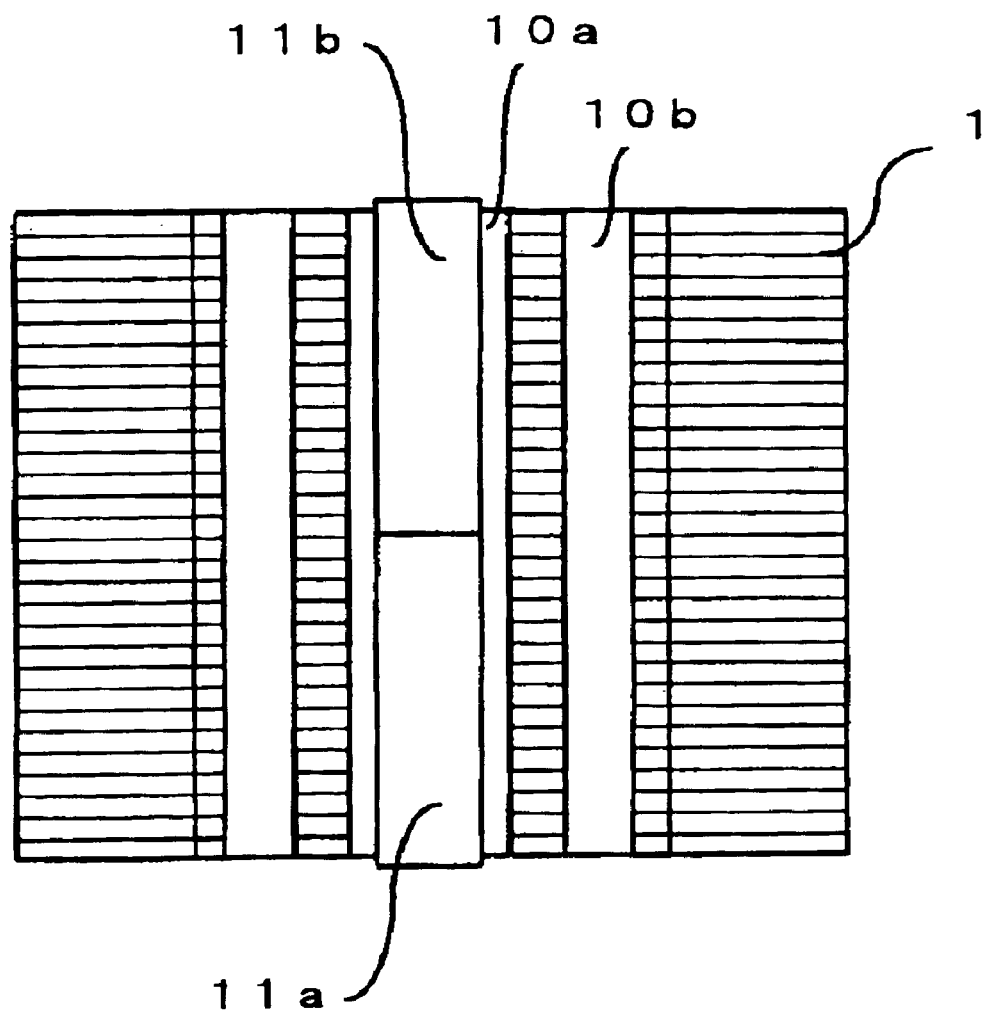
FIG. 9 is a side view showing the rotor for the synchronous induction motor according to the third embodiment.

FIG. 8 is a top view of an end of a rotor except for an end ring viewed from an axial direction of the rotor, showing another structure of the rotor for the synchronous induction motor. FIG. 9 shows a cross section of the structure of the rotor, viewed from a direction of A—A shown in FIG. 8. In FIG. 8, the slits 2 and the slots 3 are shaded for the purpose of clarity.

In the figure, a reinforcing member 11 is made of non-magnetic material and fixed to the shaft 4 of the output axis. The reinforcing member 11 is inserted to the slits 2 of the rotor or the slots 3 which are located at least in the direction of the q axis of the rotor, and reinforces the rotor against the stress in the direction of the q axis. Here, a part of the reinforcing member 11 is inserted inside the slots 3, and is made of non-magnetic material such as SUS or plastics. 10, 10a, and 10b show the filler which are filled in the slits 2 and the slots 3 and are made of conductive material such as aluminum. The rotor covers 11a and 11b have a structure which is easy to mount on the rotor by separating in two in the direction of lamination of the rotor; the rotor covers 11a and 11b contact with each other at approximate middle of the rotor in the direction of lamination within the slots 3. Further, the slots 3 to which the rotor covers 11 are inserted are placed in the direction of the q axis.

The rotor covers 11 are fixed to the shaft 4 which is a center of rotation and inserted inside the slots 3. The rotor covers are bonded within the slots 3 by the conductive material filled in the slots 3. Accordingly, the adhesiveness of the rotor covers 11 and the secondary conductor is increased, which enables the strength of the rotor against the centrifugal force. In particular, the rotor covers 11 are inserted in the slots 3 which are placed in the direction of the q axis, so that the strength of the rotor against the centrifugal force acted in the direction of the q axis can be increased. Compared with the structure shown in FIG. 6, it is possible to reduce both areas for a part facing the end of the rotor and a part facing the side of the rotor, which enables to reduce the size of the rotor covers 11 and reduce the cost of the rotor covers 11. Therefore, the synchronous induction motor can be provided at a low cost. Further, since the rotor covers 11 are not placed on the outer circumference of the rotor, the eddy current loss is not generated on the surface of the rotor covers. Therefore, the synchronous induction motor a high efficiency can be provided with.

To manufacture the rotor of the above structure, after laminating predetermined pieces of rotor iron core 1, the rotor covers 11a and 11b are inserted in the slots 3 from upward/downward in the axial direction of the rotor so as to insert the shaft 4. Then, the filler 10 such as aluminum is casted by die-casting method, etc. to generate the secondary conductor, and thus the rotor is formed.

As described above, by generating the secondary conductor after inserting the rotor covers 11 in the slots 3, the rotor covers 11 can be easily bonded. Further, the adhesiveness of the rotor covers 11 and the secondary conductor is increased, and the strength of the rotor against the centrifugal force can be also increased.

Figure 10:
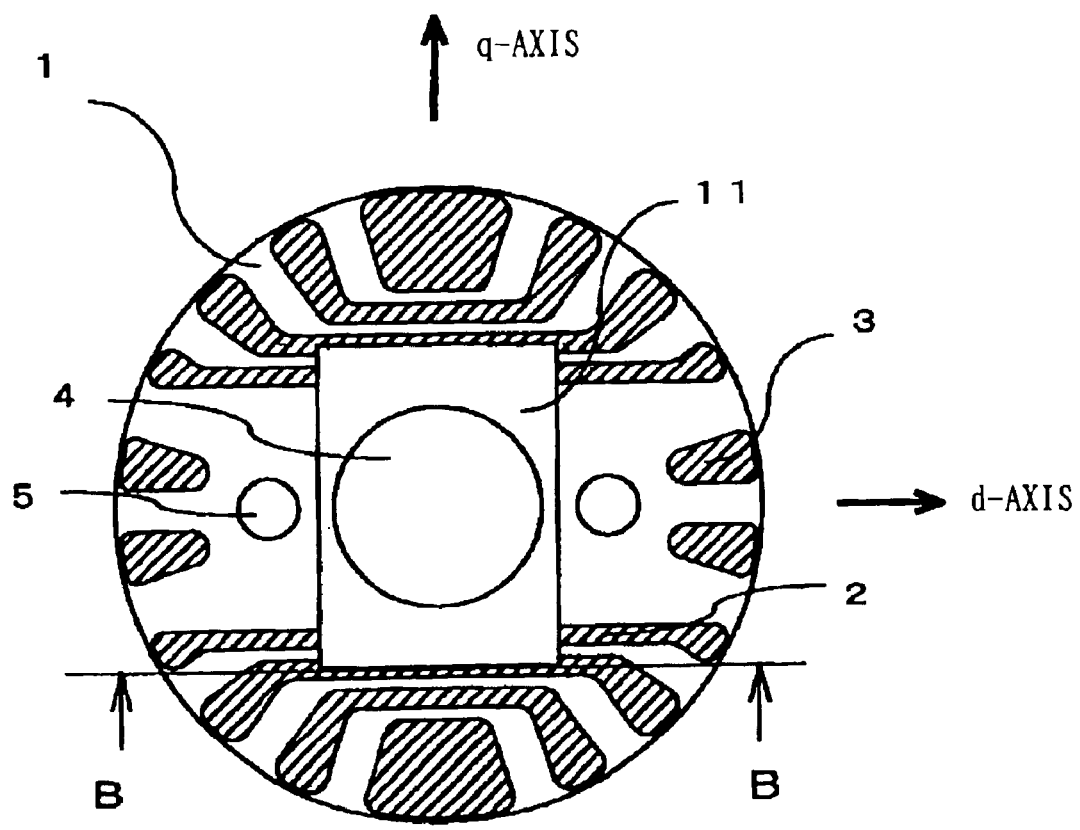
FIG. 10 is a top view showing an end side of the rotor for the synchronous induction motor in an axial direction except for an end ring according to the third embodiment.
Figure 11:
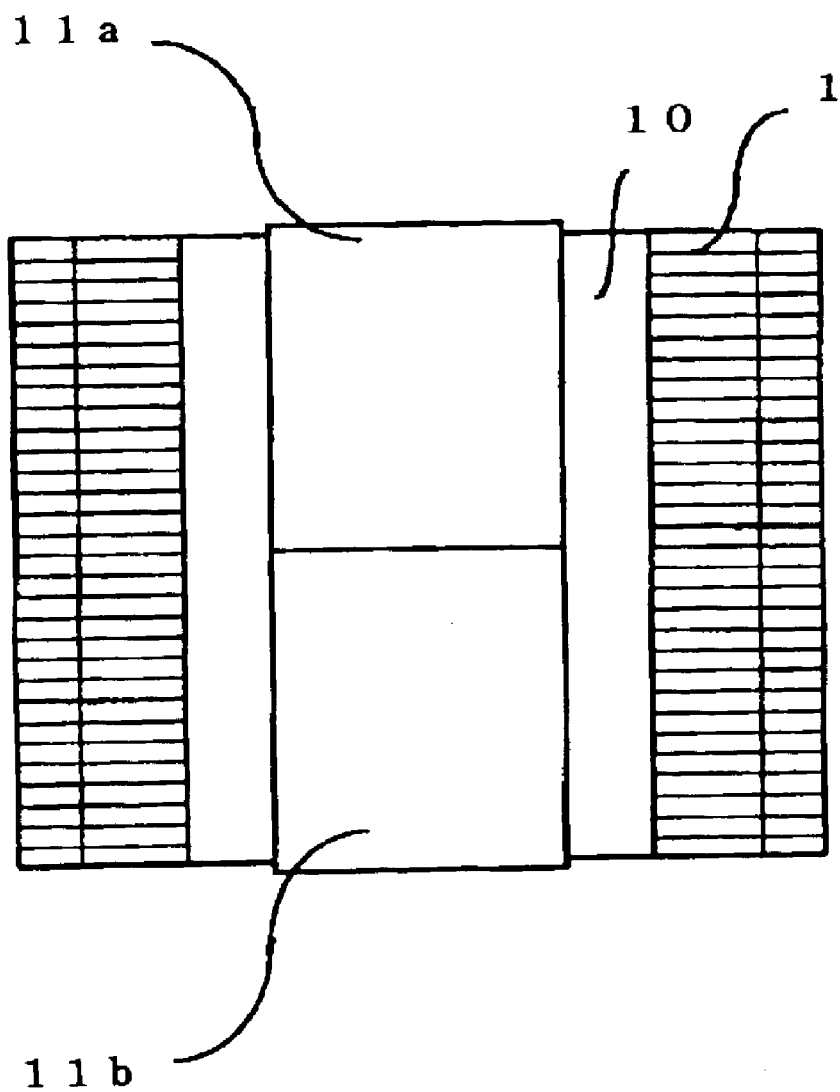
FIG. 11 is a cross sectional view showing the rotor for the synchronous induction motor according to the third embodiment.
Figure 12:
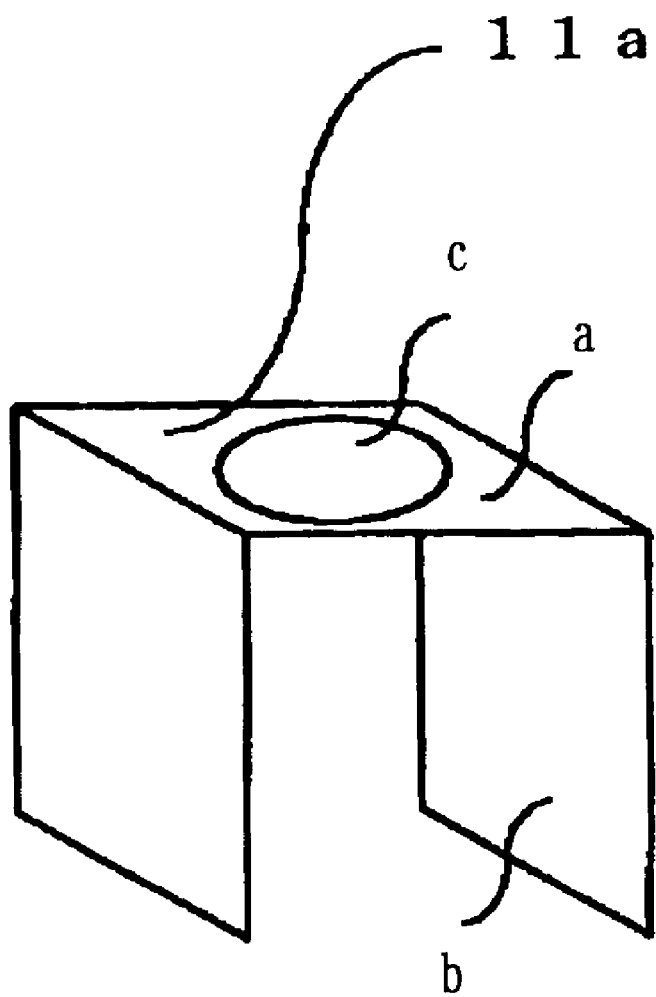
FIG. 12 is a slanted view showing a rotor cover for the synchronous induction motor according to the third embodiment.

FIG. 10 is a top view of an end except for an end ring of a rotor in an axial direction of the rotor, showing another structure of the rotor for the synchronous induction motor. FIG. 11 is a cross section of the structure of the rotor, viewed from the direction of B—B shown in FIG. 10, and FIG. 12 is a slanted view of the rotor covers 11. In FIG. 10, the slits 2 and the slots 3 are shaded for the purpose of clarity.

The rotor covers 11a and 11b are separate in the direction of lamination of the rotor so as to be easy to mount on the rotor as well as FIGS. 8 and 9. Further, in the structure of the figures, the rotor covers 11a and 11b are inserted into the slits 2 so as to reinforce the rotor against the stress in the direction of the q axis. The upper/lower rotor covers 11a and 11b are contacted with each other at approximate middle in the direction of lamination within the slits 2.

As shown in FIG. 12, the rotor covers 11a and 11b have a part 'a' placed on the end of the rotor and a part 'b' to be inserted into the slits 2, and the part 'a' is provided with a hole 'c' for inserting the shaft 4. The rotor covers 11 is fixed to the rotor by inserting the shaft 4 into this hole 'c'. Further, the part 'b' is inserted into the slits 2, and bonded by the conductive material filled in the slits 2.

The rotor covers 11 is a reinforcing member to supply enough strength to the rotor against the centrifugal force. The rotor covers 11 should be structured so as to be located at a part of the rotor having insufficient strength against the centrifugal force, and a shape or a location of the rotor cover is not limited. Further, a part which receives the centrifugal force the most upon rotation of the rotor varies and is not fixed according to the structure of the rotor or the structure of the stator. Accordingly, it is preferable to decide the location or the shape of the reinforcing member according to the structure of the rotor or the structure of the stator. In general, the rotor having the structure with the slots 3 and the slits 2 is weak against the stress in the direction of the q axis in which the lamination of thin layers is formed by the filler 12 of the secondary conductor. Further, when the centrifugal force tends to act the most on, for example, the slit 2 which is located the closest to the shaft 4, the rotor covers 11 should be inserted into the second slit 2. Accordingly, the rotor, especially the slit 2 which is located the closest to the shaft 4, can be reinforced against the stress acted so as to be pulled in the direction of the q axis.

With the above structure, the rotor covers 11 can be small and simple as shown in FIG. 12, which enables to reduce the cost of the rotor covers 11. Therefore, the synchronous induction motor can be provided at a low cost.

Further, since the rotor covers are not placed on the outer circumference of the rotor, the eddy current loss is not generated on the surface of the rotor covers, which enables to provide the synchronous induction motor with high efficiency. Compared with the structure shown in FIGS. 8 and 9, the length in the direction of the d axis can be increased, so that the structure against the centrifugal force acted in the direction of the q axis can be enhanced in a wide range of the slit 2 which is located the closest to the shaft 4 having the thin layer lamination in the direction of the d axis.

Figure 13:
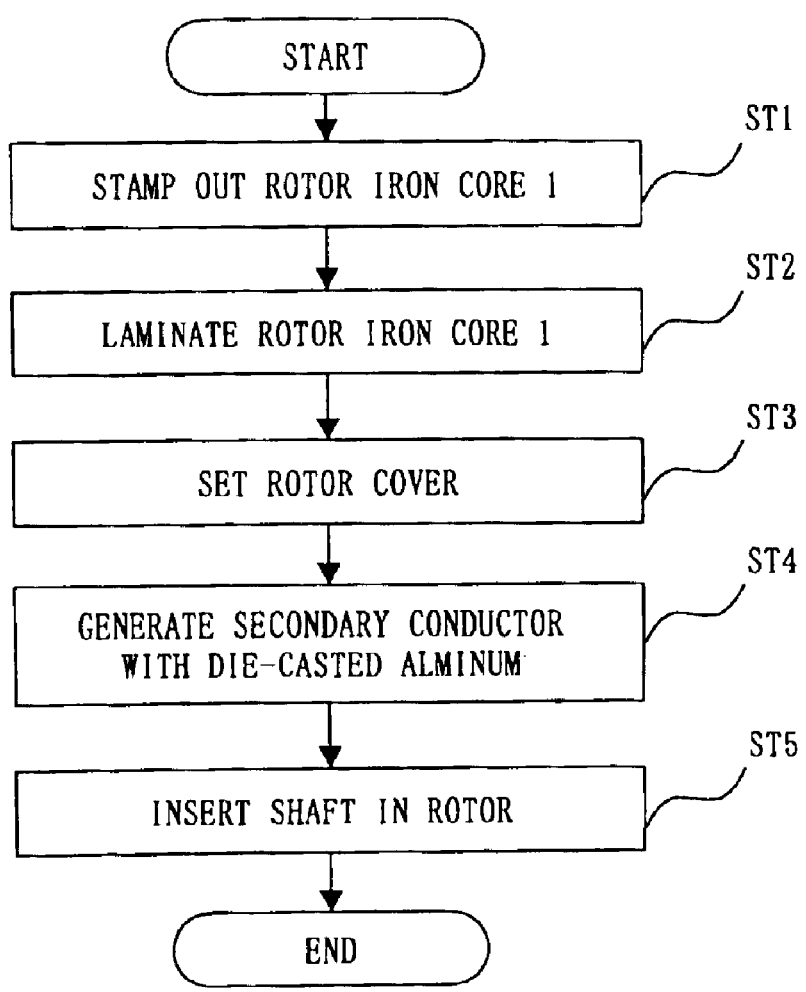
FIG. 13 is a flow diagram showing a manufacturing method for the rotor for the synchronous induction motor according to the third embodiment.

An example of manufacturing the rotor having the structure shown in FIGS. 10 through 12 will be explained according to a flow diagram sequentially step by step. FIG. 13 is a flow diagram showing the manufacturing method of the rotor for the synchronous induction motor. First, at ST1, the rotor iron core 1 is stamped piece by piece with a punching die, and at ST2, and a predetermined number of pieces of the rotor iron core 1 which are stamped out piece by piece at ST2 are laminated. Then, at ST3, the rotor covers 11 are set so as to be placed at least the outer circumference in the direction of the q axis as the reinforcing member for the laminated rotor iron core 1. At this time, in order to insert the shaft 4, the locations of the rotor iron core 1 and the hole of the rotor covers 11 are correctly matched and a tentative shaft is inserted. At ST4, the conductive material such as aluminum is filled in the rotor by the die-casting method so as to generate the secondary conductor. Finally, the tentative shaft is removed and the shaft 4 is inserted, and the rotor has been manufactured.

In this way, by generating the secondary conductor after inserting the rotor covers 11 inside the slits 2, the rotor covers 11 are fixed easily, the adhesiveness of the rotor covers 11 and the secondary conductor is increased, and the strength of the rotor can be enhanced against the centrifugal force. To embody the manufacturing method shown the above, it is required only to add the step of ST3, and there is little need to change to the conventional method. The manufacturing method of the embodiment can produce the synchronous induction motor with much strength against the centrifugal force and with a high reliability.

In the above method, the shaft 4 is inserted after aluminum die-casting, however, the order of manufacturing can be reversed.

Figure 14:
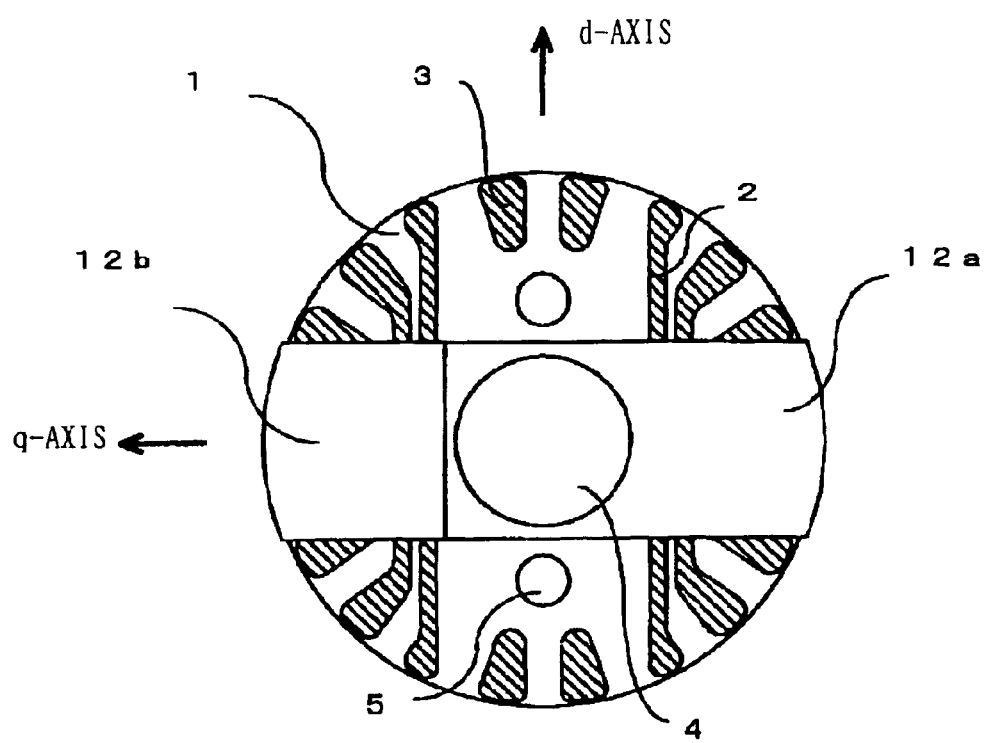
FIG. 14 is a top view showing an end side of the rotor for the synchronous induction motor in an axial direction except for an end ring according to the third embodiment.
Figure 15:
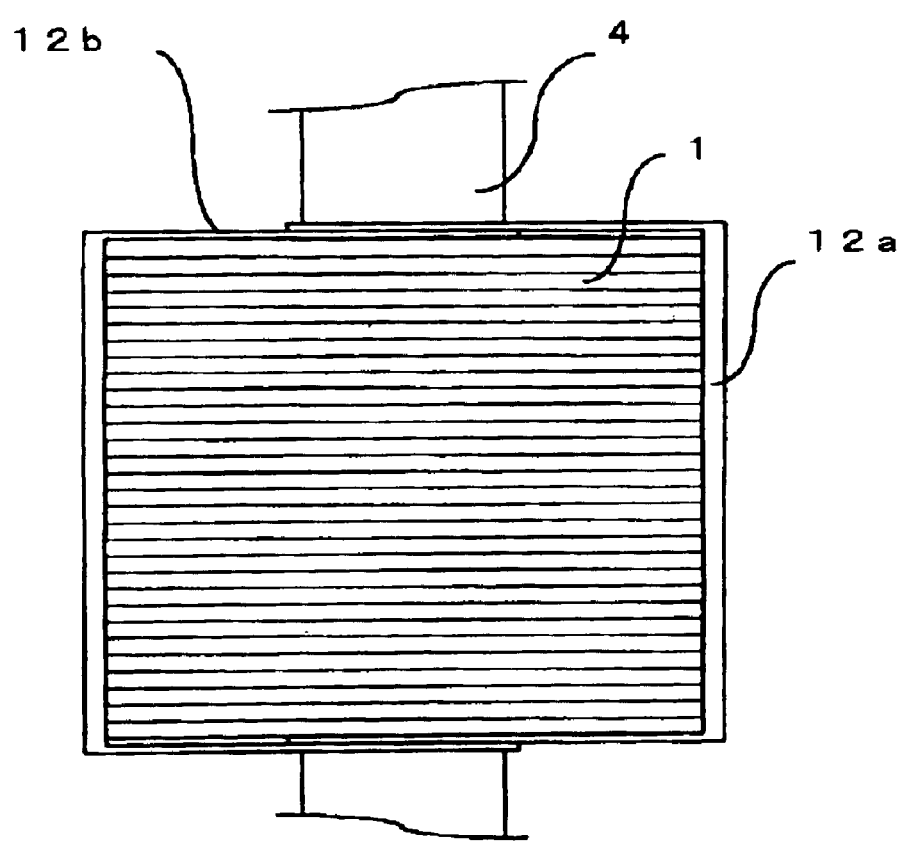
FIG. 15 is a side view showing the rotor for the synchronous induction motor according to the third embodiment.

FIG. 14 is a top view of an end of a rotor except for an end ring in an axial direction, showing another structure of the rotor for the synchronous induction motor; FIG. 15 shows a side view. In FIG. 14, the slits 2 and the slots 3 are shaded for the purpose of clarity. 12a and 12b are the rotor covers of the reinforcing member. In this structure, the rotor covers are united structure without a contacting part in the direction of lamination of the rotor, and the rotor covers are separated into plural pieces, for example, two in the direction of the circumference of the rotor iron core. Parts of the rotor covers 12a and 12b to be placed at both ends of the rotor are provided with holes for inserting the shaft, and the rotor covers 12a and 12b are fixed to the rotor with these holes of the top and the bottom. Namely, the rotor covers 12a and 12b are inserted from the outer circumference side of the laminated rotor iron core 1 and the rotor covers 12a and 12b are fixed by the shaft 4.

These rotor covers 12a and 12b are also placed at the outer circumference of the rotor at least in the direction of the q axis. Further, since the rotor covers 12a and 12b have the holes for inserting the shaft 4 at both the top and the bottom, the rotor covers 12a and 12b are fixed tightly by inserting the shaft 4. Yet further, there is no contacting part in the direction of lamination of the rotor iron core 1, which increases the strength of the rotor against the centrifugal force. Therefore, the synchronous induction motor can be provided with a high reliability.

With the above structure, upon manufacturing, the secondary conductor can be generated after setting the rotor covers 12a and 12b to the rotor iron core 1, and on the contrary, the rotor covers 12a and 12b can be set after generating the secondary conductor.

Embodiment 4.

Figure 16:
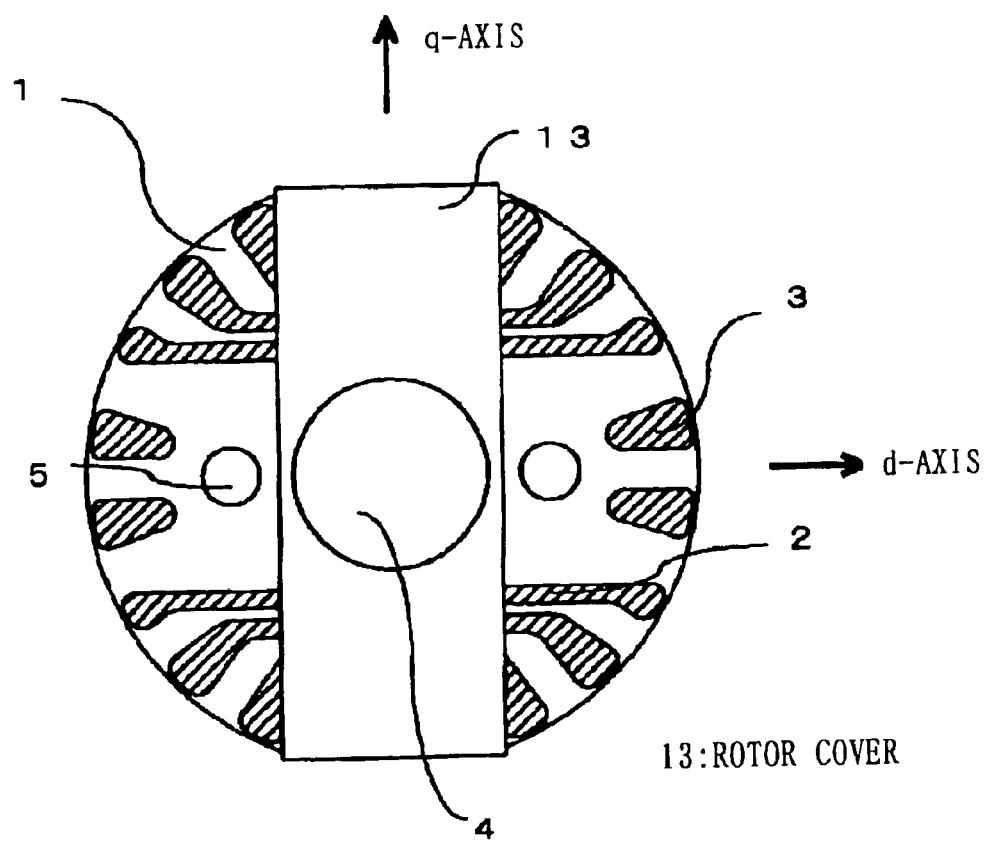
FIG. 16 is a top view showing an end side of a rotor for a synchronous induction motor in an axial direction except for an end ring according to the fourth embodiment of the present invention.
Figure 17:
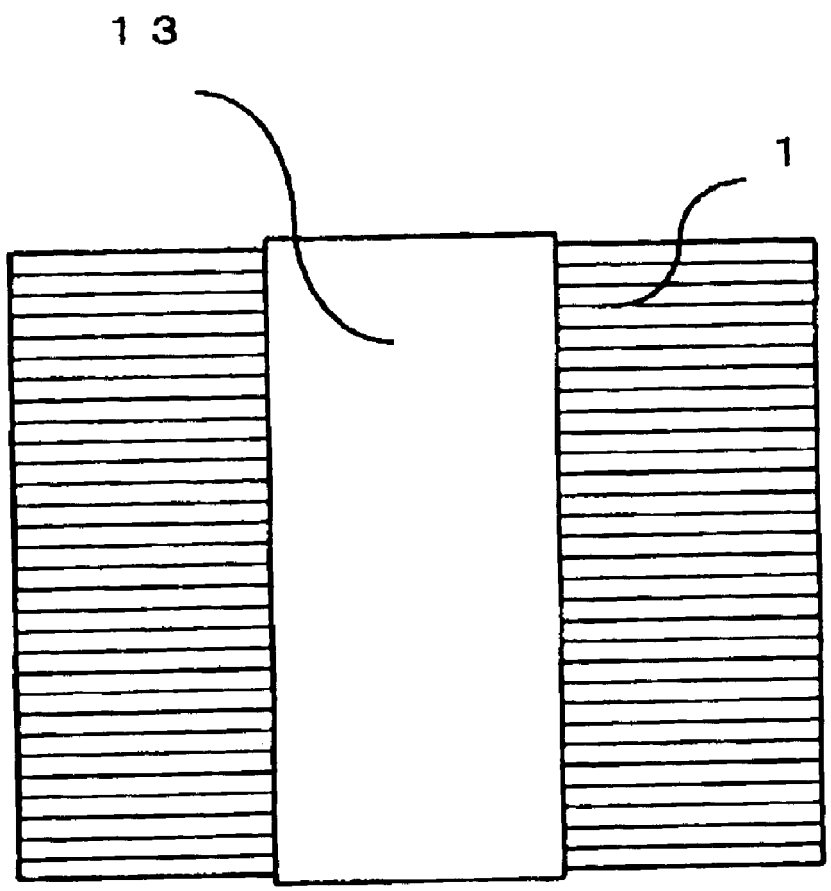
FIG. 17 is a side view showing the rotor for the synchronous induction motor according to the fourth embodiment.

The fourth embodiment of the present invention will be explained referring to the figures. FIG. 16 is a top view of an end of a rotor except for an end ring in an axial direction of the rotor for the synchronous induction motor according to the present embodiment. FIG. 17 shows a side view. In FIG. 16, the slits 2 and the slots 3 are shaded for the purpose of clarity.

Figure 18:
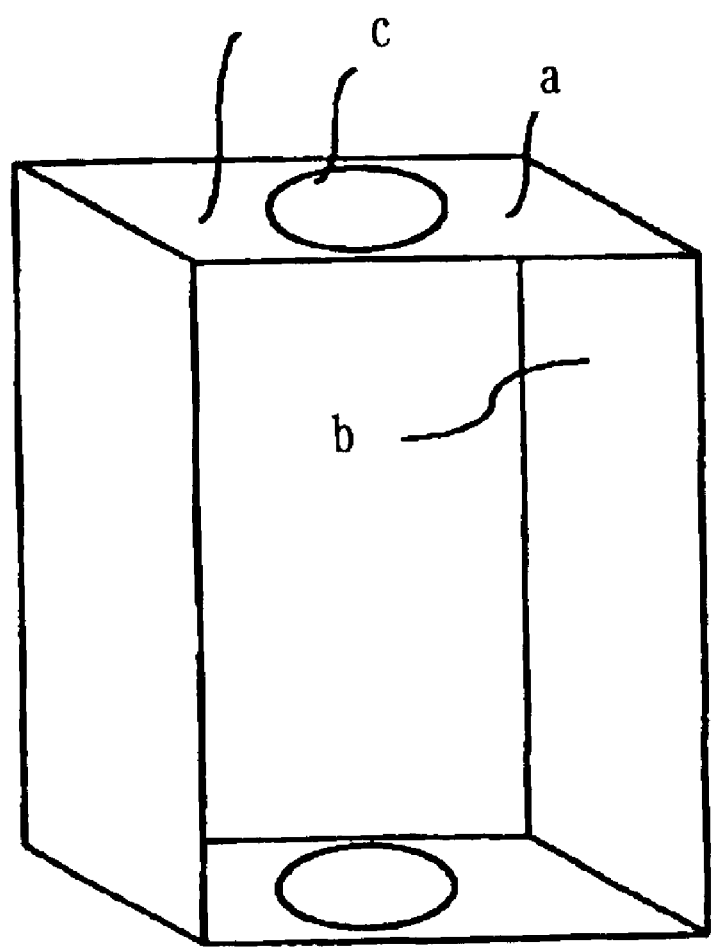
FIG. 18 is a slanted view showing a rotor cover for the synchronous induction motor according to the fourth embodiment.

According to the present embodiment, a flat part is provided at the outer circumference side of the rotor iron core 1 in the direction of q axis, the rotor cover 13 is placed at these flat parts, and the rotor cover 13 reinforces the rotor from the flat parts of the outer circumference. FIG. 18 is a slanted view showing the rotor cover 13. The same signs are put on the same or corresponding elements to ones in the first embodiment, and their explanation is omitted here. Main structure, operation, driving effects are the same as the first embodiment as the synchronous induction motor.

When the reinforcing member such as the rotor cover is provided at the outer circumference side of the rotor iron core 1, the following problem will occur. That is, a gap between the rotor and the stator which is placed around the rotor becomes large, so that a loss of the synchronous induction motor will be increased. To avoid this problem, if the gap is set to a predetermined amount, the thickness of the rotor cover should be thinned, which decreases the strength against the centrifugal force. Further, if the rotor cover is not constructed with a high precision, the rotor cover may touch the stator when the rotor rotates.

To solve these problems, according to the present embodiment, a flat plane is provided at the outer surface of the rotor in the direction of q axis, and a rotor cover 13 is held by the flat plane and the shaft 4. The rotor cover 13 is placed on the outer circumference side of the rotor in the direction of q axis, so that the strength of the rotor, especially in the direction of q axis, can be increased.

Further, by placing the flat plane in the direction of q axis, even if the gap of the direction of q axis becomes wide, the feature of the synchronous induction motor is not degraded; such that the loss at synchronizing timing of the synchronous induction motor is increased. Further, it is possible to reduce the sidze of the gap between the rotor and the stator at arc part other than the flat plane, which enables to obtain the synchronous induction motor with high efficiency.

Next, a manufacturing method for the rotor of the embodiment will be explained. After laminating a predetermined number of pieces of the rotor iron core 1, the rotor cover 13 is inserted by sliding from the direction of the d axis into the laminated rotor iron core. The locations of the holes for the shaft 4 of the rotor iron core 1 and of the rotor cover 13 are matched so that the shaft 4 can be inserted. Then, the shaft 4 is inserted after generating the secondary conductor using the die-casting method, etc., the rotor iron core 1 and the rotor cover 13 are fixed to complete manufacturing the rotor.

In this way, since the flat plane is provided at the outer circumference side of the rotor and the rotor cover 13, the rotor cover 13 can be slided and mounted from the side of the rotor iron core 1, and the rotor cover 13 can be formed as one unit. Since the rotor cover 13 can be formed as one unit without a contacting part, the strength of the rotor cover 13 against the centrifugal force is increased and the synchronous induction motor with high reliability can be obtained.

Further, it is possible to insert the rotor cover 13 after forming the secondary conductor by, for example, aluminum using die-casting method. By this method, the rotor cover 13 can be set easily, which enables to obtain the synchronous induction motor with high productibity.

Yet further, since there is no need to make a side face 'b' of the rotor cover 13 an arc, it is easy to form the rotor cover 13.

In the rotor covers which are divided in the direction of lamination of the rotor iron core or which are divided at the top/bottom end of the rotor as shown in FIGS. 5 and 14, respectively, in the third embodiment, the form of the rotor cover of the fourth embodiment can be applied, in which the flat plane is provided at least the direction of the q axis of the rotor and the outer circumference of the rotor cover 13. This case is also effective, since the rotor cover can be formed without extending the gap between the rotor and the stator. And further, it is easier to form the rotor cover 13 than a case the rotor cover is made an arc.

In the foregoing description of the first through fourth embodiments, the synchronous induction motor has a structure in which the conductive material is filled in both the slit 2 and the slot 3. However, the structure is not limited to this, namely, the first through fourth embodiments can be also applied to the synchronous induction motor to obtain the same effect, in which the conductive material is filled in the slot 3 and is not filled in the slit 2 or is filled a part of the slit 2.

If the conductive material is not filled in the slit 2, the unfilled slit 2 makes an opening, which reduces the weight of the rotor itself compared with the rotor in which the conductive material is filled in all of the slits 2. By reducing the weight of the rotor, the centrifugal force becomes small upon operating the motor. In addition to reducing the weight of the rotor, the rotor is reinforced against the centrifugal force acted in the direction of the q axis by the reinforcing member, which enables to obtain the rotor of the synchronous induction motor with long endurance and high reliability.

Further, the opening of the slit 2 can be used as, for example, the opening 5 which is placed in the direction of the d axis to be mounted on the compressor. In this case, the opening 5 is not required to be placed, which facilitates the magnetic flux to flow in the direction of the d axis, and it is possible to generate the salient pole more certainly with the q axis in which the magnetic flux can hardly flow. Therefore, the synchronous induction motor with a good efficiency can be obtained.

Embodiment 5.

Figure 19:
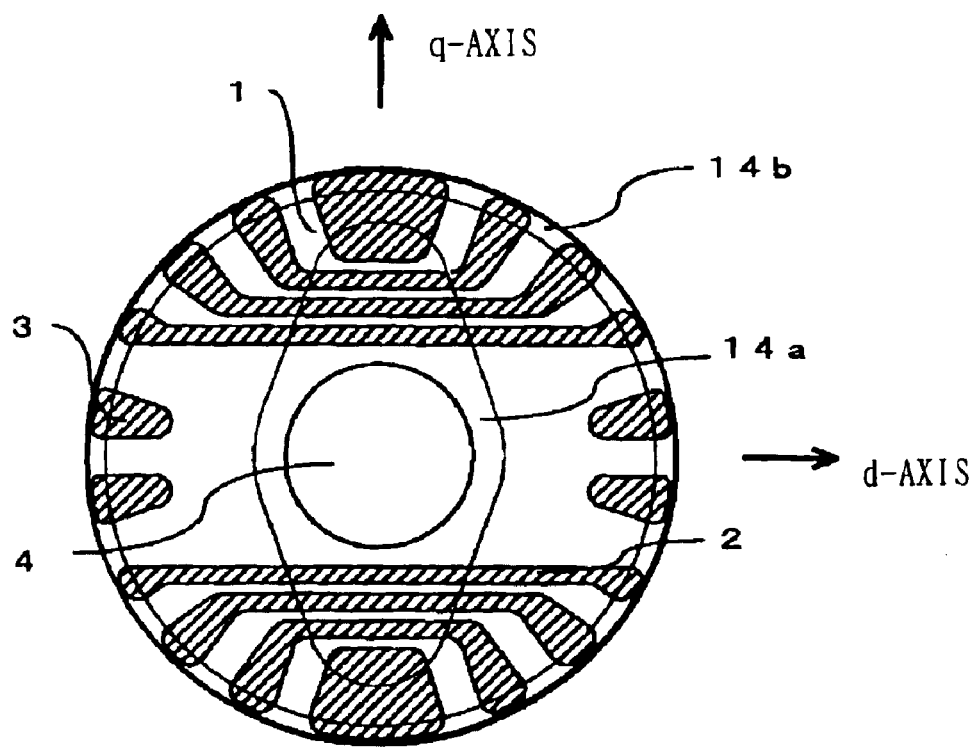
FIG. 19 is a top view showing an end side of a rotor for a synchronous induction motor in an axial direction except for an end ring according to the fifth embodiment of the present invention.
Figure 20A:
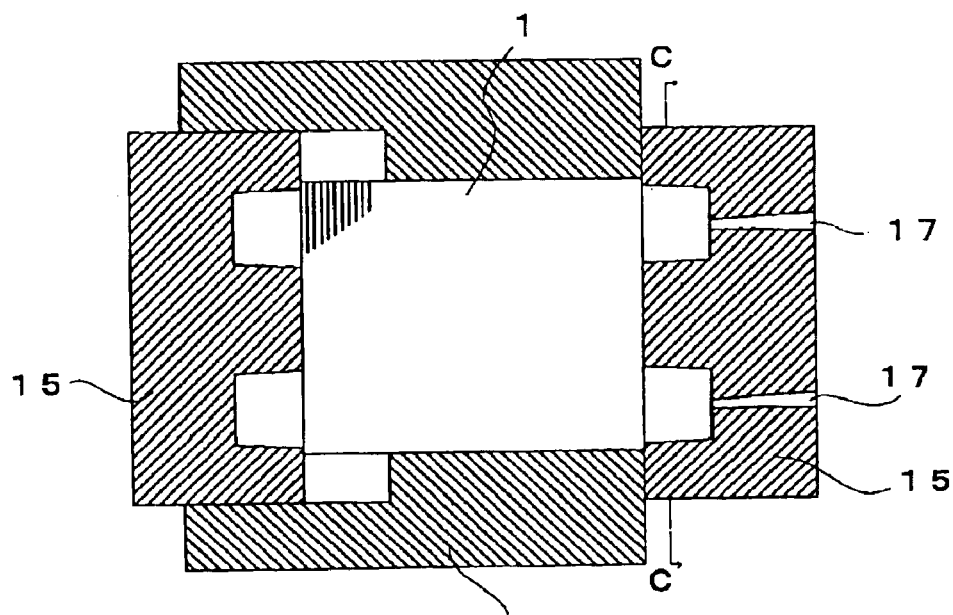
FIG. 20A is a cross sectional view showing a die for die-casting method in relation to the fifth embodiment.
Figure 20B:
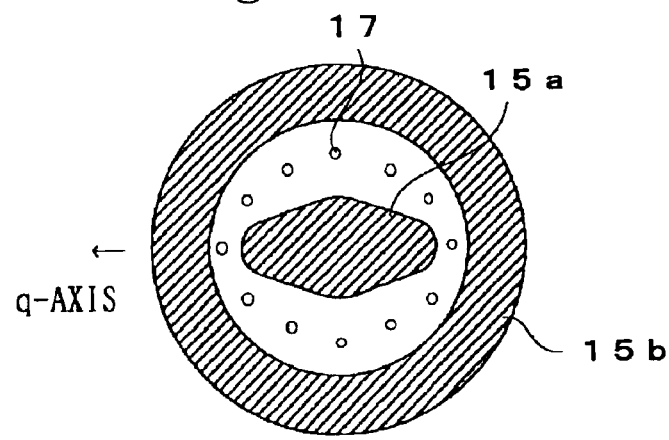
FIG. 20B is a cross sectional view showing a mold for an end ring used for die-casting method in relation to the fifth embodiment.
Figure 21:
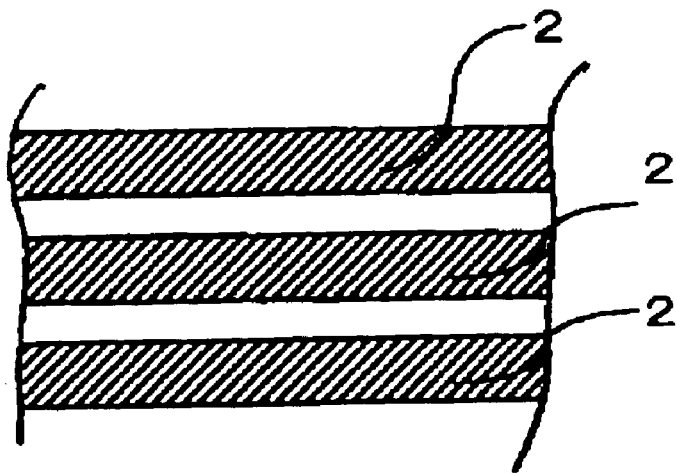
FIG. 21 is a partial enlarged view showing a slit of the rotor for the synchronous induction motor.
Figure 22:
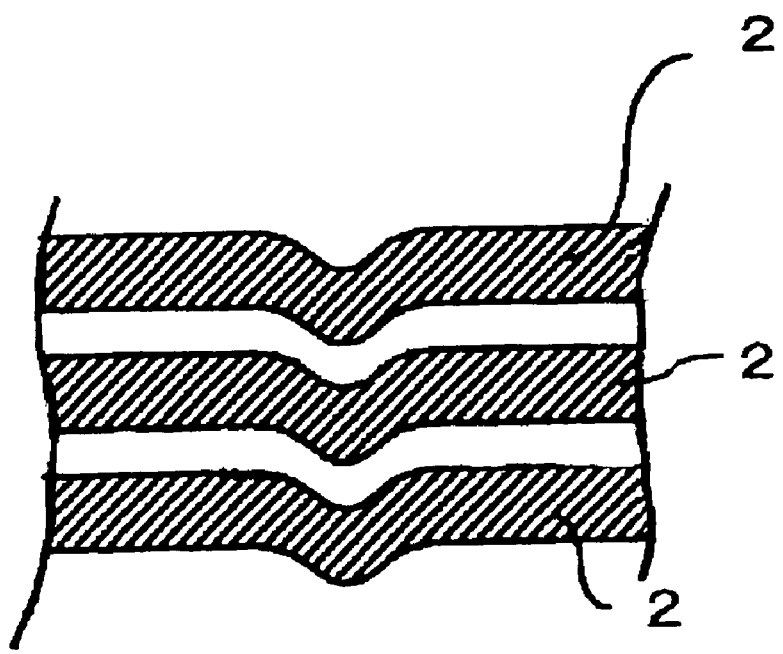
FIG. 22 is a partial enlarged view showing a slit of the rotor for the synchronous induction motor.

In the following, the fifth embodiment of the present invention will be explained referring to the figures. FIG. 19 is a top view showing an end side of a rotor for a synchronous induction motor in an axial direction except for an end ring. FIGS. 20A and 20B is a cross sectional view showing a die and an end ring die used for die-casting method: FIG. 20A is a cross sectional view of the die to produce the secondary conductor; and FIG. 20B is a cross sectional view of the end ring die. FIGS. 21 and 22 are partial enlarged views showing a part of the rotor around the slit 2. In FIGS. 19, 21, and 22, the slit 2 and the slot 3 are shaded for the purpose of clarity. Further, the same signs are used for the same or the corresponding part as ones in the first embodiment, and their explanation is omitted here. The main structure, the operation, and the effect of the rotor for the synchronous induction motor are the same as one in the first embodiment.

In FIGS. 19 through 22, 14a and 14b show parts of both top and bottom ends of the rotor iron core 1 in the axial direction which are pressed by the end ring die on filling aluminum of the conductive material into the slit 2 and the slot 3 using die-casting method. 15 shows the end ring die which is a die (the second die) for producing the end ring at both ends of the rotor. By 15a and 15b, the end face of the rotor iron core 1 in the direction of lamination is pressed, and the die-casting is performed. The center part of the end of the rotor is pressed by the end ring die 15a, and the circumference part of the end of the rotor is pressed by the end ring die 15b. 16 is an outer circumference die (the first die) for holding the outer circumference side of the rotor iron core 1, which prevents the rotor iron core 1 from expanding to the outside at filling aluminum. 17 is a filling hole, from which aluminum is poured at filling the conductive material.

In the die shown in FIG. 20A, there is a space (a gap) within the left outer circumference of the rotor iron core. This space is necessary for pressing the rotor iron core 1 by the end ring die. Even if the pressure is added from the left side of the left end ring die 15, the left end ring die 15 and the outer circumference die 16 are not contacted with each other on the end of the rotor iron core, so that the die 15 can be pressed firmly to the rotor iron core 1. Further, by providing an appropriate space, even if the number of lamination of the rotor iron core 1 is reduced, pressing can be adjusted by the space, so that the same die can be used, which provides the die at a low cost.

The material for the end ring die 15 is not particularly limited as long as the material has enough strength against the pressure added towards the direction of lamination of the rotor iron core 1 at die-casting. Similarly, the material for the outer circumference die 16 is not particularly limited as long as the material has enough strength against the pressure added towards the outside of the circumference direction of the rotor iron core.

Parts of the magnetic steel plate which is a material of the rotor iron core 1 are lined with extremely narrow widths among the slits 2 and connected each other. When the secondary conductor such as aluminum is filled in the slits 2 using the die-casting method, if the die-casting is performed under low pressure, aluminum is not filled uniformly, which causes a space inside the secondary conductor. This space degrades the startup features of the synchronous induction motor, and further increases the vibration and the noise due to the induction torque.

On the other hand, if the die-casting is performed under high pressure, the stress is concentrated on the narrow parts of the magnetic steel plate among the slits 2 as shown in FIG. 22, which causes to deform this parts and may degrade the characteristics of the synchronous induction motor on synchronizing. Further, aluminum is not die-casted uniformly, which causes variation of the induction torque from startup of the electric motor to synchronous pull-in, and increases the vibration or the noise.

In the present embodiment, the parts among the slits 2 are pressed by the end ring die 15 from the both ends of the rotor iron core 1 on die-casting. Namely, the part of the magnetic steel plate around the q axis at the center part, especially, the slits 2 having the narrow layers, is pressed from upward/downward using the end ring die 15a, and the circumference of the rotor iron core 1, especially, the outer circumference of the slot 3 which is thin is pressed from upward/downward using the end ring die 15b so as not to be deformed. And the die-casting is performed under high pressure. The die-casting with high pressure is performed in this way with pressing firmly the thin parts of the magnetic steel plate around the slit 2 or the slots 3, the aluminum of the filler is filled uniformly in the slit 2 without deforming the magnetic steel plate. Therefore, the synchronous induction motor which can prevent the reduction of the efficiency at synchronous operation can be obtained. Further, it can be implemented to decrease the vibration and the noise from startup to synchronous pull-in.

Figure 23:
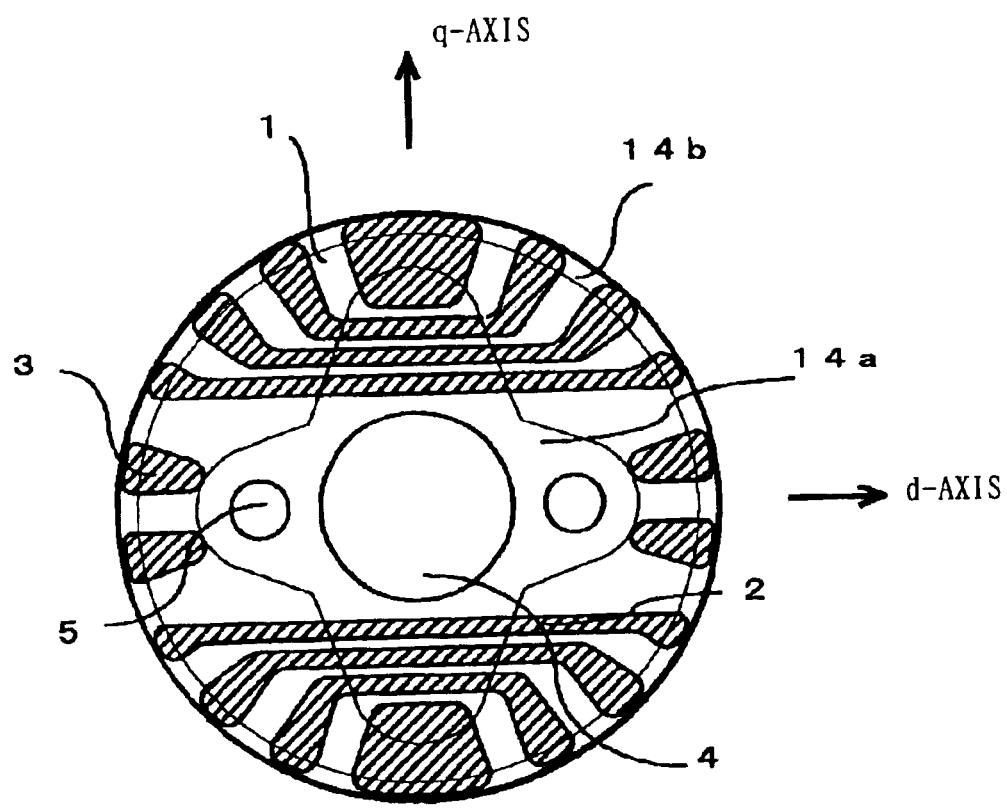
FIG. 23 is a top view showing an end side of the rotor for the synchronous induction motor in an axial direction except for the end ring according to the fifth embodiment.
Figure 24:
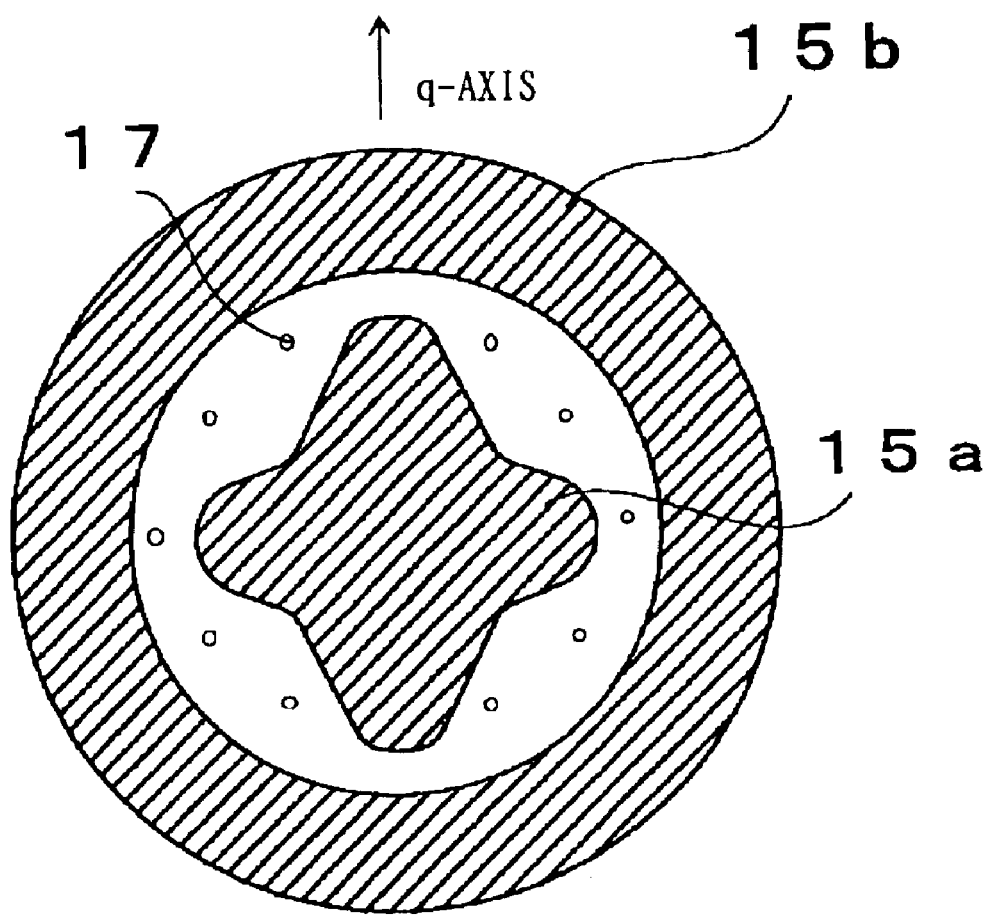
FIG. 24 is a cross sectional view showing the mold for the end ring used for die-casting method in relation to the fifth embodiment.
Figure 25:
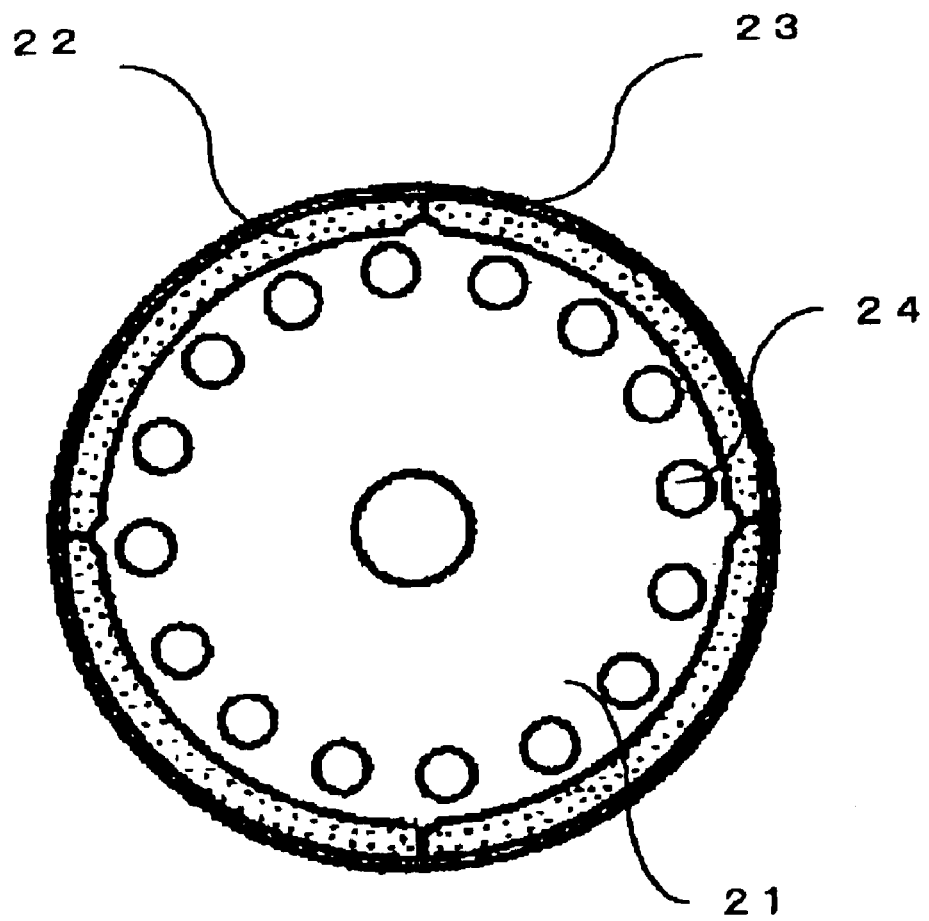
FIG. 25 is a cross sectional view taken horizontally showing a rotor for a conventional permanent magnetic synchronous motor.

FIG. 23 shows another configuration of the rotor for the synchronous induction motor, namely, the figure is a top view showing an end side of a rotor in an axial direction except for an end ring. FIG. 24 is a cross sectional view of an end ring die. In FIG. 23, the slit 2 and the slots 3 are shaded for the purpose of clarity.

In this structure, the rotor iron core 1 has an opening 5. When the synchronous induction motor of the embodiment is mounted on, for example, a compressor, it is necessary to provide the opening 5 as a passage of refrigerant so as not to degrade the performance of the compressor. In case of this structure, by making the end ring die 15a for the both ends of the rotor iron core 1 a cross shape when aluminum is die-casted, it is possible to prevent the opening 5 from filling with aluminum. Consequently, the passage for the refrigerant can be provided, and the performance of the compressor can be secured.

Any form can be used for the end ring die 15a for the center part, however, if the end ring die 15a has a form extended in the direction of the q axis, the filler can be filled uniformly in the slit 2 of the narrow layers.

The manufacturing method in relation to the present embodiment will be explained.

First, similarly to the steps shown in FIG. 13, at ST1, at least one pair of slits provided at a rotor and generating salient pole in a direction of a d axis in which the magnetic flux can flow easily and in a direction of a q axis in which the magnetic flux can hardly flow, and plural slots located at an outer side of the slit and connected to at least one end of the slit in the direction of the d axis to generate induction torque are stamped out from the rotor iron core 1 with a punching die piece by piece. Next, at ST2, the rotor iron core 1 stamped out piece by piece is laminated by a predetermined number. At this time, a temporary shaft should be inserted in the center part of the rotor iron core 1.

In this embodiment, the reinforcing member is not used, there is no step shown by ST3, and the process moves to ST4. The outer circumference side of the rotor iron core 1 is pressed by an outer circumference die 16, and the both ends are pressed by a pair of the end ring dies 15. At this time, at least the part of one end of the rotor iron core 1 around the q axis is pressed on a part to be pressed 14a by the end ring die 15a for the center part towards the other end side. At the same time, a part to be pressed 14b for the circumference of the end of the rotor iron core 1 is pressed by the end ring die 15b towards the other end side. Accordingly, the rotor iron core 1 is sealed by the dies 15 and 16, remaining the part to be filled with the conductive material as a space. With this status, the conductive material, for example, aluminum is poured into the slit 2 and the slots 3 from a filling hole 17 provided at one of the end ring dies 15. This generates the secondary conductor. Finally, the temporary shaft is removed and the shaft 4 is inserted at ST5, and the rotor has been produced.

By performing the die-casting with pressing the both ends of the rotor iron core 1 using the end ring dies 15a and 15b, the end ring 7 is formed at the part which is not covered by the end ring dies 15a and 15b. A space is formed at the center of the end ring 7, however, this space does not effect to the operation of the secondary conductor having a cage shape. When the synchronous induction motor of the embodiment is mounted on the compressor and if the opening is required at the rotor, the opening 5 can be provided by die-casting with making the end ring die 15a so as to cover the opening 5 as shown in FIG. 24.

Using this manufacturing method, without changing the conventional manufacturing method much, it is possible to obtain the manufacturing method for the rotor for the synchronous induction motor with high reliability.

In the above explanation, the synchronous induction motor has a structure in which both the slit 2 and slot 3 are filled with the conductive material, however, the fifth embodiment can be applied to the synchronous induction motor having another structure in which the conductive material is filled in the slot 3 and is not filled in the slit 2 or filled in only a part of the slits 2. In case of applying to the synchronous induction motor in which the conductive material is not filled in the slit 2 or filled in only a part of the slits 2, another member is previously inserted in the other part of the slits 2 which is not to be filled with the conductive material. After die-casting the conductive material, the inserted member is removed. On die-casting, a part of the end of the rotor iron core 1 at least around the q axis is pressed towards the other end using the end ring die 15, so that deformation of the slits 2 can be certainly prevented. Accordingly, the rotor for the synchronous induction motor with high reliability can be obtained.

When the synchronous induction motor in each of the second through the fifth embodiments is mounted on the compressor, it is possible to obtain a compressor with high efficiency, since the synchronous induction motor does not slip and is thus highly effective compared with the induction motor. Further, it is possible to enhance the strength against the centrifugal force of the rotor on rotating, and obtain the synchronous induction motor with durability and high reliability. Since the permanent magnet is not used in the synchronous induction motor, the recyclability in case of disposing the electric motor.

The synchronous induction motor has two poles in the first through the fifth embodiments, however, the same effect can be obtained on applying to the electric motor having equal to or more than four poles. For example, aluminum is used for the material of the secondary conductor, however, another conductive material can be used. For the rotor cover as the reinforcing member, for example, SUS is used, however, another non-magnetic body can be used.

According to the suitable embodiment of the present invention, a rotor for a synchronous induction motor having:

at least one pair of slits provided at a rotor and forming salient poles in a direction of a d axis in which the magnetic flux can flow easily and in a direction of a q axis in which the magnetic flux can hardly flow;

plural slots located at an outer circumference side of the at least one pair of slits and connected to at least one end of each slit of the at least one pair of slits in the direction of the d axis to generate induction torque;

a conductive material filled in at least the plural slots among the at least one pair of slits and the plural slots; and a reinforcing member, which is a non-magnetic body, located at least an outer circumference side in the direction of the q axis for reinforcing the rotor from the outer circumference side. And thus, it is possible to obtain the rotor for the synchronous induction motor with increased strength against the centrifugal force and with high recyclability.

In the rotor for the synchronous induction motor according to the suitable embodiment of the invention, the reinforcing member is the non-magnetic body and non-conductive material, so that it is possible to obtain the rotor for the synchronous induction motor with increased strength against the centrifugal force and with high reliability, which can eliminate the eddy current loss and prevent the generation of heat of the rotor.

In the rotor for the synchronous induction motor according to the suitable embodiment of the invention, the reinforcing member has plural holes, so that it is possible to obtain the rotor for the synchronous induction motor with increased strength against the centrifugal force, which can reduce the eddy current loss and prevent the decrease of the efficiency.

In the rotor for the synchronous induction motor according to the suitable embodiment of the invention, the plural holes provided at the reinforcing member are located at approximately same position as the slot located an outer circumference. And thus, the strength against the centrifugal force can be increased, and the rotor for the synchronous induction motor can be obtained with increased startability and synchronous pull-in capacity by enhancing secondary current.

The rotor for the synchronous induction motor according to the suitable embodiment of the invention includes an output axis located at a center of rotation, and the reinforcing member is fixed to the output axis. And thus, it becomes possible to obtain the rotor for the synchronous induction motor with increased strength against the centrifugal force at a low cost.

According to the suitable embodiment of the present invention, the rotor for the synchronous induction motor includes a flat plane at an outer circumference side in the direction of the q axis of the rotor, so that the reinforcing member is placed at the flat plane. And thus, the rotor for the synchronous induction motor with further durability against the centrifugal force can be obtained.

In the rotor for the synchronous induction motor according to the suitable embodiment of the invention, the reinforcing member is divided into plural pieces in a direction of lamination or a circumference direction of an iron core of the rotor. And thus, it becomes possible to obtain the rotor for the synchronous induction motor with increased strength against the centrifugal force and high productivity.

According to the suitable embodiment of the present invention, a rotor for a synchronous induction motor having:

at least one pair of slits provided at a rotor and forming salient poles in a direction of a d axis in which the magnetic flux can flow easily and in a direction of a q axis in which the magnetic flux can hardly flow;

plural slots located at an outer circumference side of the at least one pair of slits and connected to at least one end of each slit of the at least one pair of slits in the direction of the d axis to generate induction torque;

a conductive material filled in at least a part of the at least one pair of slits and the plural slots;

an output axis located at a center of rotation of the rotor; and a reinforcing member, which is a non-magnetic body, fixed to the output axis and inserted in the slits of the rotor or at least one of the plural slots located in the direction of the q axis of the rotor to reinforce the rotor against a stress acted in the direction of the q axis. And thus, it becomes possible to obtain the rotor for the synchronous induction motor with increased strength against the centrifugal force and high reliability at a low cost.

In the rotor for the synchronous induction motor according to the suitable embodiment of the invention, a part of the at least one pair of slits or a part of the plural slots which inserts the reinforcing member is fixed to the at least one pair of slits and the plural slots by the conductive material filled in the at least the part of the at least one pair of slits and the plural slots. And thus, the strength against the centrifugal force can be further increased, which enables to obtain the rotor for the synchronous induction motor with high reliability.

According to the suitable embodiment of the present invention, a rotor for a synchronous induction motor includes:

at least one pair of slits provided at a rotor and forming salient poles in a direction of a d axis in which the magnetic flux can flow easily and in a direction of a q axis in which the magnetic flux can hardly flow;

plural slots located at an outer circumference side of the at least one pair of slits and connected to at least one end of each slit of the at least one pair of slits in the direction of the d axis to generate induction torque; and a conductive material filled in at least the plural slots among the at least one pair of slits and the plural slots under a condition in which at least a part adjacent to the q axis of one end of the rotor is pressed towards other end of the rotor. And thus, it becomes possible to obtain the rotor for the synchronous induction motor with low vibration, low noise and high reliability, in which the conductive material can be filled without deforming the slits, the feature at synchronization is not degraded.

According to the suitable embodiment of the present invention, a compressor having enough strength against the centrifugal force and with high reliability can be obtained, since the rotor of the synchronous induction motor according to the embodiment is mounted on the compressor.

According to the suitable embodiment of the present invention, a manufacturing method of a rotor for a synchronous induction motor having:

at least one pair of slits provided at a rotor and forming salient poles in a direction of a d axis in which the magnetic flux can flow easily and in a direction of a q axis in which the magnetic flux can hardly flow; and plural slots located at an outer circumference side of the at least one pair of slits and connected to at least one end of each slit of the at least one pair of slits in the direction of the d axis to generate induction torque, the manufacturing method includes steps of:

stamping the at least one pair of slits and the plural slots on an iron core of the rotor;

laminating the iron core of the rotor stamped;

filling conductive material in the at least the plural slots among the at least one pair of slits and the plural slots under a condition in which at least a part adjacent to the q axis of one end of the rotor is pressed towards other end of the rotor. And thus, the manufacturing method of the rotor for the synchronous induction motor with low vibration, low noise and high reliability, in which the conventional manufacturing method is not changed much, the conductive material can be filled without deforming the slits, and the degradation of the feature at synchronization is prevented.

According to the suitable embodiment of the present invention, a die of a rotor for a synchronous induction motor having:

a first die for pressing an outer circumference side of an iron core of the rotor; and a pair of second dies for pressing both ends of the iron core of the rotor so that conductive material is filled from one end to other end at least through a slot, and the pair of second dies presses an outline of an end of the iron core of the rotor, and presses by extending at a center of the end of the iron core of the rotor in a direction of a q axis in which is magnetic flux can hardly flow. And thus, the die of the rotor for the synchronous induction motor with low vibration, low noise and high reliability can be obtained, in which the conductive material can be filled without deforming the slits, and the degradation of the feature at synchronization is prevented.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed:

1. A rotor for a synchronous induction motor, comprising:
    at least one pair of slits forming salient poles in a direction of a d axis in which a magnetic flux can flow easily and in a direction of a q axis in which the magnetic flux can hardly flow;
    a plurality of slots positioned at an outer circumferential portion of the at least one pair of slits and configured to generate induction torque, one end of each slit of the at least one pair of slits being connected to a respective one of said plurality of slots in the direction of the d axis;
    a conductive material filled in the plurality of slots and the at least one pair of slits;
    an output axis positioned at a center of rotation of the rotor;
    a flat plane positioned at an outer circumference of said rotor in the direction of the q axis; and
    a reinforcing member having a non-magnetic body positioned at the flat plane and fixed to the output axis, the reinforcing member configured to reinforce the rotor.

2. The rotor for the synchronous induction motor according to claim 1, wherein the reinforcing member is includes a non-conductive material.

3. The rotor for the synchronous induction motor according to claim 1, wherein the reinforcing member includes a plurality of holes.

4. The rotor for the synchronous induction motor according to claim 3, wherein the plurality of holes are located at approximately a same position where the plurality of slots are positioned.

5. The rotor for the synchronous induction motor according to claim 1, wherein the reinforcing member is divided into a plurality of pieces in a direction of lamination or a circumferential direction of an iron core of the rotor.

6. A compressor comprising the rotor of the synchronous induction motor according to claim 1.

7. A rotor for the synchronous induction motor, comprising:
    at least one pair of slits forming salient poles in a direction of a d axis in which a magnetic flux can flow easily and in a direction of a q axis in which the magnetic flux can hardly flow;
    a plurality of slots positioned at an outer circumferential portion of the at least one pair of slits and configured to generate induction torque, one end of each slit of the at least one pair of slits being connected to a respective one of said plurality of slots in the direction of the d axis;
    an end ring die positioned on one end face of the rotor and configured to press the one end face towards other end face of the rotor; and
    a conductive material filled in the plurality of slots and the at lest one pair of slits under a condition in which at least a part adjacent to the q axis of the one end face of the rotor is pressed towards the other end face of the rotor.

* * * * *